US007798761B2

(12) United States Patent
Goodrich et al.

(10) Patent No.: US 7,798,761 B2
(45) Date of Patent: Sep. 21, 2010

(54) ELECTRONIC CONTROL SYSTEM AND METHOD FOR AN AUXILIARY DEVICE INTERLOCK SAFETY SYSTEM

(75) Inventors: Ronald Goodrich, Winamac, IN (US); Keith Heigl, Winamac, IN (US); Donald S. Sturm, Dayton, OH (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 12/346,384

(22) Filed: Dec. 30, 2008

(65) Prior Publication Data

US 2009/0271077 A1 Oct. 29, 2009

Related U.S. Application Data

(63) Continuation of application No. 10/579,363, filed as application No. PCT/US2004/038380 on Nov. 17, 2004, now abandoned, which is a continuation-in-part of application No. 10/142,712, filed on May 10, 2002, now Pat. No. 6,825,628, which is a continuation-in-part of application No. PCT/US01/27102, filed on Aug. 31, 2001.

(60) Provisional application No. 60/520,848, filed on Nov. 18, 2003, provisional application No. 60/229,922, filed on Sep. 1, 2000.

(51) Int. Cl.
*B60P 1/44* (2006.01)
(52) U.S. Cl. .................... 414/462; 414/540; 414/921; 318/468

(58) Field of Classification Search ......... 318/264–266, 318/286, 466, 468; 414/462, 540, 541, 545, 414/921; 187/306
See application file for complete search history.

(56) References Cited

U.S. PATENT DOCUMENTS

| 3,651,965 | A | 3/1972 | Simonelli et al. |
| 3,874,527 | A | 4/1975 | Royce |
| 4,164,292 | A | 8/1979 | Karkau |
| 4,176,999 | A | 12/1979 | Thorley |
| 4,251,179 | A | 2/1981 | Thorley |

(Continued)

OTHER PUBLICATIONS

"The 1999 Ford Windstar", VMI Voice Technical Edition, Publication, Apr. 1999.

(Continued)

*Primary Examiner*—Walter Benson
*Assistant Examiner*—Eduardo Colon
(74) *Attorney, Agent, or Firm*—Michael Best & Friedrich LLP

(57) ABSTRACT

A controller, control system and method for controlling an auxiliary device comprising a wheelchair lift, ramp, or the like are provided. An exemplary embodiment of the auxiliary device controller is microprocessor-based and communicates with a vehicle's OEM controller for receiving a plurality of sensor inputs, which originate from OEM and auxiliary sensors, process the sensor inputs, and control various OEM and auxiliary systems relative to the sensor inputs to effect a number of safety interlocks. The controller may operate to coordinate various OEM and auxiliary subsystems to automate auxiliary device operation to reduce operator error.

46 Claims, 16 Drawing Sheets

U.S. PATENT DOCUMENTS

| | | | |
|---|---|---|---|
| 4,325,668 A | 4/1982 | Julian et al. | |
| 4,339,224 A | 7/1982 | Lamb | |
| 4,576,539 A | 3/1986 | Williams | |
| 5,140,316 A | 8/1992 | DeLand et al. | |
| 5,180,275 A | 1/1993 | Czech et al. | |
| 5,261,779 A | 11/1993 | Goodrich | |
| 5,293,632 A | 3/1994 | Novakovich et al. | |
| 5,299,904 A | 4/1994 | Simon et al. | |
| 5,305,355 A | 4/1994 | Go et al. | |
| 5,308,214 A | 5/1994 | Crain et al. | |
| 5,350,986 A | 9/1994 | Long et al. | |
| 5,380,144 A | 1/1995 | Smith et al. | |
| 5,389,920 A | 2/1995 | DeLand et al. | |
| 5,391,041 A | 2/1995 | Stanbury et al. | |
| 5,396,158 A * | 3/1995 | Long et al. | 318/282 |
| 5,434,487 A | 7/1995 | Long et al. | |
| 5,697,048 A | 12/1997 | Kimura | |
| 5,737,335 A | 4/1998 | Mizuta et al. | |
| 5,769,480 A * | 6/1998 | Gebhardt | 296/65.12 |
| 5,825,098 A | 10/1998 | Darby et al. | |
| 5,835,873 A | 11/1998 | Darby et al. | |
| 5,979,114 A | 11/1999 | Clark et al. | |
| 6,028,537 A | 2/2000 | Suman et al. | |
| 6,042,327 A | 3/2000 | Deleo et al. | |
| 6,053,693 A | 4/2000 | Ringdahl et al. | |
| 6,064,165 A * | 5/2000 | Boisvert et al. | 318/465 |
| 6,075,460 A | 6/2000 | Minassale et al. | |
| 6,077,025 A | 6/2000 | Budd et al. | |
| 6,179,545 B1 | 1/2001 | Petersen, Jr. et al. | |
| 6,238,168 B1* | 5/2001 | Cohn et al. | 414/537 |
| 6,238,169 B1 | 5/2001 | Dupuy et al. | |
| 6,275,167 B1 | 8/2001 | Dombrowski et al. | |
| 6,300,879 B1 | 10/2001 | Regan et al. | |
| 6,302,439 B1 | 10/2001 | McCurdy | |
| 6,357,992 B1 | 3/2002 | Ringdahl et al. | |
| 6,409,458 B1* | 6/2002 | Cohn et al. | 414/537 |
| 6,515,377 B1 | 2/2003 | Ubelein et al. | |
| 6,594,565 B1 | 7/2003 | Schafer et al. | |
| 6,825,628 B2* | 11/2004 | Heigl et al. | 318/468 |
| 7,186,205 B2 | 3/2007 | Lahr et al. | |
| 7,274,980 B1 | 9/2007 | Schafer et al. | |
| 7,417,395 B2 | 8/2008 | Edwards et al. | |
| 7,453,224 B2* | 11/2008 | Sullivan | 318/433 |
| 7,684,915 B1 | 3/2010 | Dailey et al. | |
| 2003/0007853 A1* | 1/2003 | Cohn et al. | 414/537 |
| 2003/0044266 A1 | 3/2003 | Vandillen et al. | |
| 2005/0177288 A1 | 8/2005 | Sullivan et al. | |
| 2006/0104775 A1 | 5/2006 | Kasten et al. | |
| 2007/0086879 A1* | 4/2007 | Goodrich et al. | 414/537 |
| 2009/0240402 A1* | 9/2009 | Lugash et al. | 701/49 |

OTHER PUBLICATIONS

"Activan, Accessibility with Style. Conversion of General Motors Minivans", Service Manual, Dec. 9, 1999, Published by Ricon Corporation.
"Braun Entervan", Brochure, 2001, Published by the Braun Corporation.
"Entervan, The Braun Corporation", Series 03 and later Fully-Automatic 1996 and newer Chrysler Entervan II, Owner's/ Service Manual, Revision Aug. 1998, 5230096-03.
Holicky, Richard, "Big Vans, Minivans Pros and Cons", New Mobility Magazine, Jun. 1997.
"Honda Odyssey Minivan Conversion", Owner's Manual, Oct. 2006, Published by VMI.
"New Ramp & Electrical Systems on All Power Rampvans", Available online at: <www.ims-vans.com/RampElectrical.htm>, May 12, 1999.
"Odyssey 2005-2006 Electrical Troubleshooting", Manual, Mar. 2006, Published by American Honda Motor Co., Inc.
"Automotive: Serial Communication", Installation Guide Model MPC01 Multi-Purpose Controller, 1998, Published by Whelan Engineering Company Inc., Chester, CT.
"Automotive: Serial Communication", Installation Guide Model MPC01 Multi-Purpose Controller, 1995, Published by Whelan Engineering Company Inc., Chester, CT.
Sunderlin, Ann, "Van-Tastic, How'd They Do That", Nov. 1995, Paraplegia News Magazine.
"Wheels 2000 and Beyond", New Mobility Magazine, p. 48, publicly available prior to Jan. 1, 2002.
"VMI-4 Ford Windstar Factory Door Lockout Relay Pack", "Operation Characteristics of the VMI-4 Module", Technical Service Manual, Mar. 9, 2000.
"IMS Quality Team 1991-2001 Service Manual" Independent Mobility Systems, Inc. (Jan. 8, 1999).
"Honda Odyssey Minivan Conversion Owner's Manual" Vantage Mobility International (Oct. 2006).
"Ricon Activan Illustrated Index of Non-OEM Vehicle Equipment Including Electrical and Pneumatic Circuit Diagrams plus Diagnostic Flow Charts" Ricon Corporation, pp. 1-1 to 3-5 (May 10, 1999 -Jun. 3, 1999).
"Ricon Activan General Motors Minivan Conversion Service Manual - 32DV0002.C" Ricon Corporation, pp. 1-1 to 6-13 (Jan. 3, 2000).
"Ricon Activan Service/Owner Manual - 35DACT00.E" Ricon Corporation (Dec. 3, 1998).
Declaration of Steven Stadler (Jul. 28, 2006).
"Ricon Activan Conversion of General Motors Minivans Service Manual - 32DV0002.A" Ricon Corporation (Dec. 9, 1999).
"Ricon Activan Conversion of General Motors Minivans Service Manual - 32DV0002.B" Ricon Corporation (Dec. 9, 1999).
"Vantage Mini Vans Technical Service Manual" Vantage Mobility International (Jul. 10, 1997).
"IMS-Vans.com Whois Record" accessed from Domain Tools. Sep. 19, 2009.
Various Power Sliding Door Electrical Diagrams for 1997-1999 Model-Year Vehicles, accessed from Alldata Online. Aug. 20, 2009.
Waybackmachine www.ims-vans.com Website Excerpts from 1998-1999.
Waybackmachine www.braunlift.com Website Excerpts from 2000.
Correspondence, Pricing Lists and Invoices Relating to Ricon Activan (1999).
"EV Braun Entervan Brochure" The Braun Corporation (1999).
"Entervan Application Guide" The Braun Corporation (Jan. 1999).
"IMS Service Manual 1996-1998 Chrysler NS 1996-1998 Ford Windstar" Independent Mobility Systems, Inc. (Nov. 24, 1997).
"IMS Service Manual 1994-1995 Chrysler" Independent Mobility Systems, Inc. (May 3, 1996).
"Plaintiff The Braun Corporation's Claim Terms at Issue and Proposed Definitions" *The Braun Corporation* v. *Vantage Mobility International, LLC* et al., Civil Action No. 06-cv-050 RL, United States District Court for the Northern District of Indiana Hammond Division (Jun. 14, 2007).
"Plaintiff's Responses to Defendant American Honda Motor Co., Inc.'s First Set of Interrogatories (Nos. 1-12)" *The Braun Corporation* v. *Vantage Mobility International, LLC* et al., Civil Action No. 06-cv-050 RL, United States District Court for the Northern District of Indiana Hammond Division (Dec. 18, 2006).
Draft Invalidity Claim Chart for IMS System: '628 Patent by David M. Auslander. Mar. 26, 2009.
"Braun's Responses to VMI's Requests for Admissions" *The Braun Corporation* v. *Vantage Mobility International, LLC*, Civil Action No. 2:06-cv-050-JVB-PRC, United States District Court for the Northern District of Indiana Hammond Division (Apr. 5, 2010).
Draft Invalidity Claim Chart for Ricon System: '628 Patent by David M. Auslander. Mar. 26, 2009.
Braun OEM Door Patent Review by Paul Edwards and Summary of Paul Edwards Interview Jun. 3, 2006.
"SAE J1850 Class B Data Communications Network Interface J1850 Topics" Bill Wiegand, GM Service Technology Group (Feb. 16, 1998).
"List of Terms to be Defined in the '628 Patent" *The Braun Corporation* v. *Vantage Mobility International, LLC*, Civil Action No. 2:06- cv-050-RL-PRC, United States District Court for the Northern District of Indiana Hammond Division (Jun. 14, 2007).
"VMI's Supplemental Answer to Interrogatory No. 9" *The Braun Corporation* v. *Vantage Mobility International, LLC* et al., Civil Action No. 06-cv-050 RL, United States District Court for the Northern District of Indiana Hammond Division (May 27, 2009).
"Parties' Responses to Proposed Order & Opinion- Transcript of Proceedings" *The Braun Corporation* v. *Vantage Mobility International, LLC*, Civil Action No. 2:06-cv-050-JVB, United States District Court for the Northern District of Indiana Hammond Division (Jul. 28, 2008).
"Vantage Mobility International, LLC's Answers to Interrogatories" *The Braun Corporation* v. *Vantage Mobility International, LLC* et al., Civil Action No. 06-cv-050 RL, United States District Court for the Northern District of Indiana Hammond Division (Mar. 12, 2007).
"Initial Disclosure Statement" *The Braun Corporation* v. *Vantage Mobility International, LLC*, Civil Action No. 2:06-cv-050-RL, United States District Court for the Northern District of Indiana Hammond Division (Sep. 12, 2006).
"Vantage Mobility International, LLC's Answers to Braun's Third Set of Interrogatories" *The Braun Corporation* v. *Vantage Mobility International, LLC* et al., Civil Action No. 06-cv-050 RL, United States District Court for the Northern District of Indiana Hammond Division (May 14, 2007).
Ricon Updated Remote Control Specification (Mar. 20, 1998).
Vantage Mobility International, LLC's Answers to Braun's First Set of Interrogatories, *The Braun Corporation* v. *Vantage Mobility International, LLC* et al., Civil Action No. 06-cv-050 RL, United States District Court for the Northern District of Indiana Hammond Division (Dec. 18, 2006).
"Supplemental Answers to Interrogatories" *The Braun Corporation* v. *Vantage Mobility International, LLC* et al., Civil Action No. 06-cv-050 RL, United States District Court for the Northern District of Indiana Hammond Division (May 15, 2009).
"Amended Complaint for Patent Infringement" *The Braun Corporation* v. *Vantage Mobility International, LLC* et al., Civil Action No. 06-cv-050 RL, United States District Court for the Northern District of Indiana Hammond Division (Jun. 15, 2006).
"Vantage Mobility International's Third Supplemental Responses to Requests for Production" *The Braun Corporation* v. *Vantage Mobility International, LLC* et al., Civil Action No. 06-cv-050 RL, United States District Court for the Northern District of Indiana Hammond Division (Mar. 12, 2007).
"Defendant Vantage Mobility International, LLC's Answer to Plaintiff's Complaint and Counterclaim" *The Braun Corporation* v. *Vantage Mobility International, LLC*, Civil Action No. 2:06-cv-050-RL-PRC, United States District Court for the Northern District of Indiana Hammond Division (Aug. 9, 2006).
"Amended Answer of Defendant American Honda Motor Co., Inc." *The Braun Corporation* v. *Vantage Mobility International, LLC* et al., Civil Action No. 06-cv-050 RL, United States District Court for the Northern District of Indiana Hammond Division (Aug. 22, 2006).
"Plaintiff's Reply to Defendant American Honda Motor Co.'s Counterclaim" *The Braun Corporation* v. *Vantage Mobility International, LLC* et al., Civil Action No. 06-cv-050 RL, United States District Court for the Northern District of Indiana Hammond Division (Aug. 29, 2006).
"Plaintiff's Reply to Defendant Vantage Mobility International, LLC's Counterclaim" *The Braun Corporation* v. *Vantage Mobility International, LLC* et al., Civil Action No. 06-cv-050 RL, United States District Court for the Northern District of Indiana Hammond Division (Aug. 29, 2006).
"Defendant Vantage Mobility International, LLC's Amended Answer to Plaintiff's Complaint and Counterclaim" *The Braun Corporation* v. *Vantage Mobility International, LLC*, Civil Action No. 2:06- cv-050-RL-PRC, United States District Court for the Northern District of Indiana Hammond Division (Apr. 19, 2007).
"Response to Motion to Dismiss or Strike Defendant Vantage Mobility International, LLC's Defense of Inequitable Conduct" *The Braun Corporation* v. *Vantage Mobility International, LLC*, Civil Action No. 2:06-cv-050-RL-PRC, United States District Court for the Northern District of Indiana Hammond Division (Jun. 11, 2007).

"Claim Construction Brief" *The Braun Corporation* v. *Vantage Mobility International, LLC*, Civil Action No. 2:06-cv-050-RL-PRC, United States District Court for the Northern District of Indiana Hammond Division (Jun. 28, 2007).
"Plaintiff's Response to Defendant's Claim Construction Brief" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Declaration of Mathew G. Gavronski in Support of Plaintiff's Response to Defendant's Claim Construction Brief" *The Braun Corporation* v. *Vantage Mobility International, LLC*, Civil Action No. 2:06-cv-050-RL, United States District Court for the Northern District of Indiana Hammond Division (Jul. 26, 2007).
"Reply to Plaintiff's Claim Construction Brief and Request for Hearing" *The Braun Corporation* v. *Vantage Mobility International, LLC*, Civil Action No. 2:06-cv-050-RL-PRC, United States District Court for the Northern District of Indiana Hammond Division (Jul. 26, 2007).
"Plaintiff's Sur-Reply Brief on Claim Construction and Memorandum in Support of Motion to Strike the Declaration of David M. Auslander" *The Braun Corporation* v. *Vantage Mobility International, LLC*, Civil Action No. 2:06-cv-050-JVB-PRC, United States District Court for the Northern District of Indiana Hammond Division (Oct. 5, 2007).
"Sur-Reply to Plaintiff's Reply and Sur-Reply Brief on Claim Construction" the Braun Corporation v. Vantage Mobility International, Llc, Civil Action No. 2:06-cv-050-Rl-Prc, United States District Court for the Northern District of Indiana Hammond Division (Oct. 29, 2007).
"Proposed Opinion and Order" *The Braun Corporation* v. *Vantage Mobility International, LLC*, Civil Action No. 2:06-cv-050 JVB, United States District Court for the Northern District of Indiana Hammond Division (Jul. 17, 2008).
"Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Sep. 22, 2008).
"Plaintiff's Reply to Defendant's Supplemental Claim Construction Brief" *The Braun Corporation* v. *Vantage Mobility International, LLC*, Civil Action No. 2:06-cv-050-JVB-PRC, United States District Court for the Northern District of Indiana Hammond Division (Oct. 23, 2008).
"Reply Brief in Support of Defendant's Supplemental Claim Construction Brief" *The Braun Corporation* v. *Vantage Mobility International, LLC*, Civil Action No. 2:06-cv-050-JVB, United States District Court for the Northern District of Indiana Hammond Division (Nov. 7, 2008).
"Opinion and Order" *The Braun Corporation* v. *Vantage Mobility International, LLC*, Civil Action No. 2:06-cv-050-JVB, United States District Court for the Northern District of Indiana Hammond Division (Mar. 26, 2009).
"Opinion and Order" *The Braun Corporation* v. *Vantage Mobility International, LLC*, Civil Action No. 2:06-cv-050-JVB-PRC, United States District Court for the Northern District of Indiana Hammond Division (Jan. 27, 2010).
"Defendant Vantage Mobility International, LLC's Second Amended Answer to Plaintiff's Complaint and Counterclaim" *The Braun Corporation* v. *Vantage Mobility International, LLC*, Civil Action No. 2:06-cv-050-JVB-PRC, United States District Court for the Northern District of Indiana Hammond Division (Feb. 1, 2010).
"Braun's Reply to VMI's Second Amended Counterclaim" *The Braun Corporation* v. *Vantage Mobility International, LLC*, Civil Action No. 2:06-cv-050-JVB-PRC, United States District Court for the Northern District of Indiana Hammond Division (Feb. 17, 2010).
"Defendant American Honda Motor Co., Inc's Responses to Plaintiff the Braun Corporation's First Set Of Interrogatories" *The Braun Corporation* v. *Vantage Mobility International, LLC* et al., Civil Action No. 06-cv-050 RL, United States District Court for the Northern District of Indiana Hammond Division (Dec. 18, 2006).
"Plaintiff's Claim Construction Memorandum" *The Braun Corporation* v. *Vantage Mobility International, LLC*, Civil Action No. 2:06-cv-050 RL, United States District Court for the Northern District of Indiana Hammond Division (Jun. 28, 2007).

"VMI's Response to Interrogatories" *The Braun Corporation* v. *Vantage Mobility International, LLC*, Civil Action No. 2:06-cv-050-JVB-PRC United States District Court for the Northern District of Indiana Hammond Division (Apr. 12, 2010).

"VMI's Response to Braun's Second Set of Requests for Production" *The Braun Corporation* v. *Vantage Mobility International, LLC*, Civil Action No. 2:06-cv-050-JVB-PRC United States District Court for the Northern District of Indiana Hammond Division (Apr. 12, 2010).

Declaration of Sean Whitmarsh (Apr. 9, 2010).

"Plaintiff's Responses to Vantage Mobility International, LLC's First Set of Interrogatories" *The Braun Corporation* v. *Vantage Mobility International, LLC*, Civil Action No. 2:06-cv-050-RL-PRC United States District Court for the Northern District of Indiana Hammond Division (Mar. 8, 2007).

* cited by examiner

ELECTRONIC CONTROL SYSTEM AND METHOD FOR AN AUXILIARY DEVICE INTERLOCK SAFETY SYSTEM

CROSS-REFERENCE TO RELATED PATENT APPLICATIONS

This is a continuation of U.S. patent application Ser. No. 10/579,363, filed May 16, 2006, which is a national phase filing under 35 U.S.C. §371 of International Patent Application No. PCT/US2004/038380, filed Nov. 17, 2004, and published as WO 2005/049357 on Jun. 2, 2005, which claims the benefit of and priority to U.S. Provisional Patent Application No. 60/520,848, filed Nov. 18, 2003. PCT/US2004/038380 is also a continuation-in-part of U.S. patent application Ser. No. 10/142,712, filed May 10, 2002, now U.S. Pat. No. 6,825,628, which is a continuation-in-part of International Patent Application No. PCT/US01/27102, filed Aug. 31, 2001, and published as WO 2002/018172 on Mar. 7, 2002, which claims the benefit of and priority to U.S. Provisional Patent Application No. 60/229,922, filed Sep. 1, 2000. The entire contents of each of these applications are hereby incorporated by reference.

FIELD OF THE INVENTION

The invention relates generally to an electronic control system. More particularly, the invention relates to an electronic control system for an auxiliary device, such as a wheelchair lift, with an interlock safety system.

BACKGROUND OF THE INVENTION

In the automotive field, the operation of major original equipment manufacturer (OEM) subsystems, such as the engine, emissions, transmission, and braking has become computerized, as have convenience-type features such as power locks, windows, sliding doors, and the like. Since these OEM subsystems are now usually controlled, either entirely or in part, by an OEM controller including a microcomputer, the vehicle may include a number of sensors that communicate with the OEM controller. Further, the microcomputer may additionally be programmed with software to operate various safety features in response to outputs from the sensors. For example, most modern vehicles are operative to sense when a driver is wearing a safety belt. If the driver does not employ their safety belt, the vehicle may provide a warning such as a visual indication (e.g., dashboard light or message), an audible indication (e.g., chime or warning sound), or other indication to notify and/or remind the noncompliant driver of the unsafe condition.

In another example, vehicles may also sense when one or more doors are open or ajar to prevent an occupant from accidentally falling out of the vehicle when it is in motion. In some instances, if an open door condition is detected by a door sensor, the OEM vehicle controller may operate to prevent the driver from shifting the stationary vehicle out of park or neutral. With ongoing attempts to make passenger vehicles safer, air bags are employed to prevent occupant injury during collisions. To this end and in a further example, crash sensors operate in a vehicle to detect the instance of a collision and communicate the crash occurrence to the OEM vehicle controller so that the controller may output a signal to deploy one or more air bags. Moreover, with the increasing availability of telematics (e.g., OnStar®), many vehicles are operative to automatically notify emergency services of a vehicle collision almost immediately upon the signal output of a crash sensor.

To comply with the Americans with Disabilities Act (ADA), many public and private vehicles are being equipped with auxiliary devices such as wheelchair lifts and ramps. Such auxiliary devices provide access to vehicles such as vans, busses, minivans and the like for mobility-challenged persons. Control systems for the foregoing auxiliary devices have generally relied on the assistance of the auxiliary device operators (often the vehicle driver). Unfortunately, such auxiliary device control systems have proven to be generally deficient in providing an adequate level of safety to an auxiliary device user.

Several factors have been identified which contribute to operator error: (1) the lack of familiarity with the controls, (2) the lack of standardization in the control sequence and types of controls (e.g., different controls for different lifts), and (3) the lack of operator training. In addition, even though the user of the auxiliary device may be fully visible to the operator, the operator may not be aware of the passenger's presence. This "looked but did not see" or daydreaming phenomenon is a frequent cause of motor vehicle collisions. For example, the National Highway Transportation Safety Administration (NHTSA) Office of Defects Investigation (ODI) has reported cases in which accidents occurred on vehicle wheelchair lifts when an operator accidentally tried to stow a lift with the user still on the lift platform. To this end, the NHTSA has proposed safety features known in the art as "interlocks" that are expected to help prevent the auxiliary device operator from making errors.

Additionally, lack of routine system maintenance has been cited as a cause of malfunctions of auxiliary devices. To this end, the NHTSA has proposed an "operations counter" that records each complete (i.e., through its entire range of motion) operation of the auxiliary device. The operations counter, which may provide an operator or technician with a general indication of the device's usage and/or age, is only helpful in assisting with identification of an appropriate maintenance task (e.g., preventative maintenance procedure) to be performed. For example, the auxiliary device's hydraulic system should be inspected after a predetermined number (e.g., 100) of uses.

To improve auxiliary device safety, auxiliary device controls are becoming less operator-assisted and more computerized and automated. Moreover, to enhance the safety of vehicles with installed auxiliary devices, it would be advantageous to facilitate communications between the auxiliary device's control system and the OEM controller. By communicating in this manner, the auxiliary device control system could operate to communicate with OEM subsystem elements such as sensors, switches, motors, and the like to enable a plurality of safety features and interlocks. In view of the foregoing, there exists a need for an electronic auxiliary device controller that operates to enable safety interlocks through coordination of various OEM and auxiliary subsystems, assists in system diagnostics, and indicates unsafe operating conditions such as when repair or maintenance is required, and the like.

BRIEF SUMMARY OF THE INVENTION

An electronic controller, control system and method for controlling the operation of a vehicle auxiliary device, such as a wheelchair lift installed in a vehicle, are provided. The control system includes an electronic controller with a microprocessor or the like that operates under software control to communicate with a vehicle's OEM controller and a plurality of sensors, which may be associated with OEM and auxiliary device subsystems. The auxiliary device controller processes the sensor communications to determine the occurrence of an unsafe condition, and prevents the operation of OEM and auxiliary device subsystems relative to the sensor communications to enhance the safety of a auxiliary device user. Additionally, the auxiliary device controller operates to coordinate various OEM and auxiliary device subsystems to reduce auxiliary device operator error.

BRIEF DESCRIPTION OF THE DRAWINGS

The present invention is described with reference to the accompanying figures and appendices, which illustrate embodiments of the present invention. However, it should be noted that the invention as disclosed in the accompanying figures and appendices is illustrated by way of example only.

DETAILED DESCRIPTION OF THE EXEMPLARY EMBODIMENTS

Figure 2:
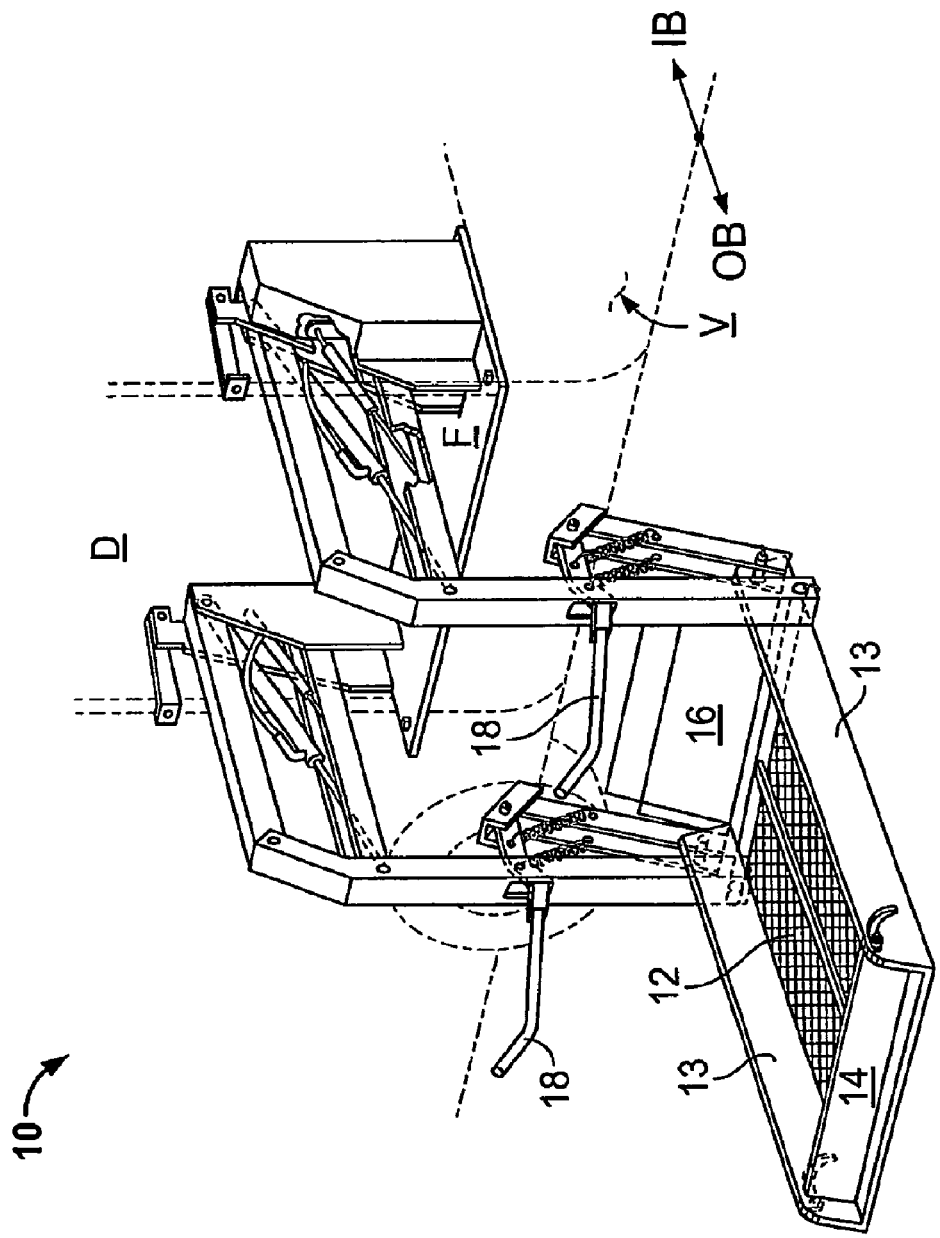
FIG. 2 is a perspective view of an exemplary auxiliary device for which the exemplary electronic controller of FIG. 1 may be employed.
Figures 1, 3A:
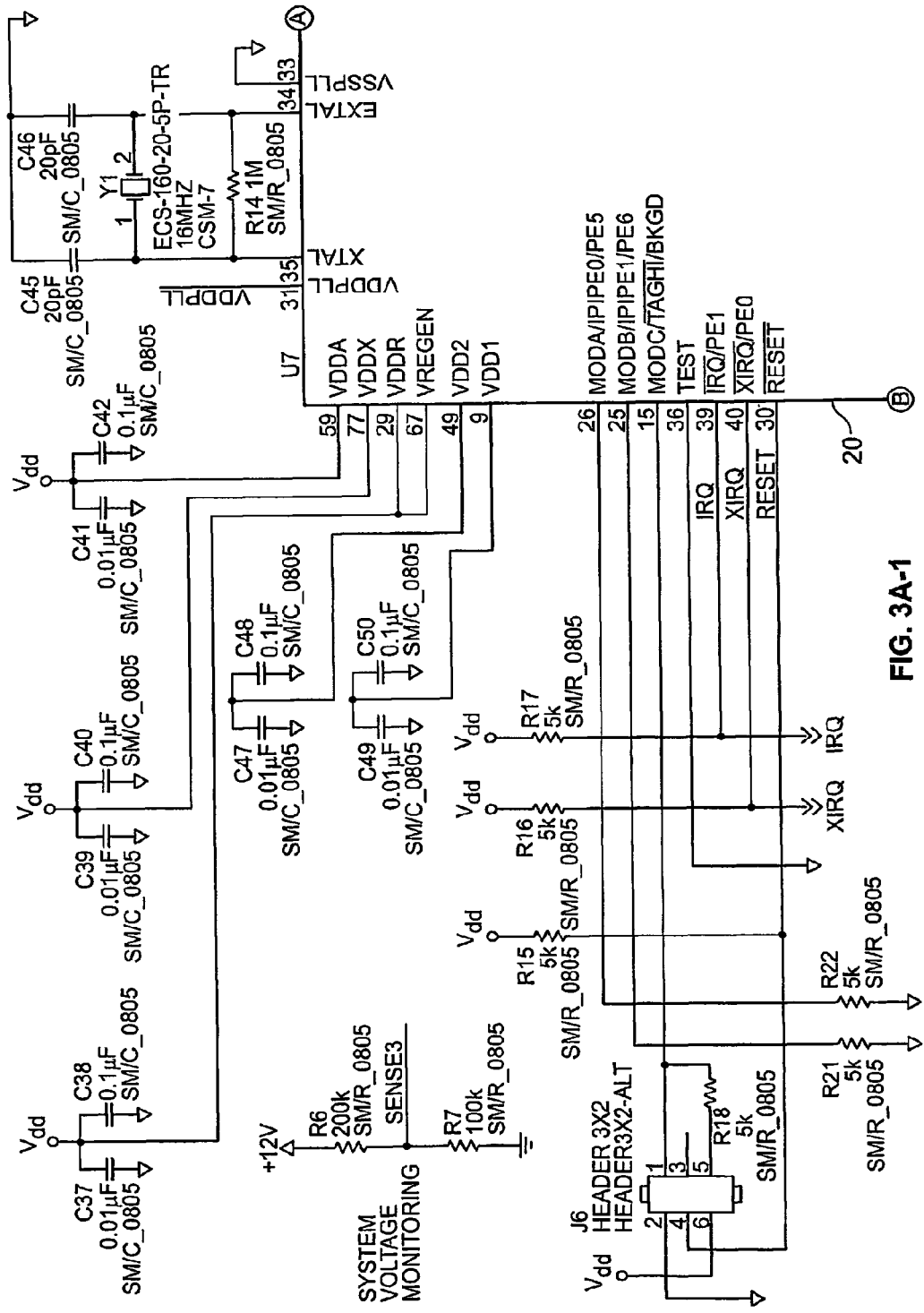
FIGS. 3A-1 through 3A-4, 3B-1 through 3B-5 and 3C-1 through 3C-4 illustrate electrical circuit schematic diagrams for one exemplary embodiment of the electronic controller of FIG. 1.
Figures 2, 3A:
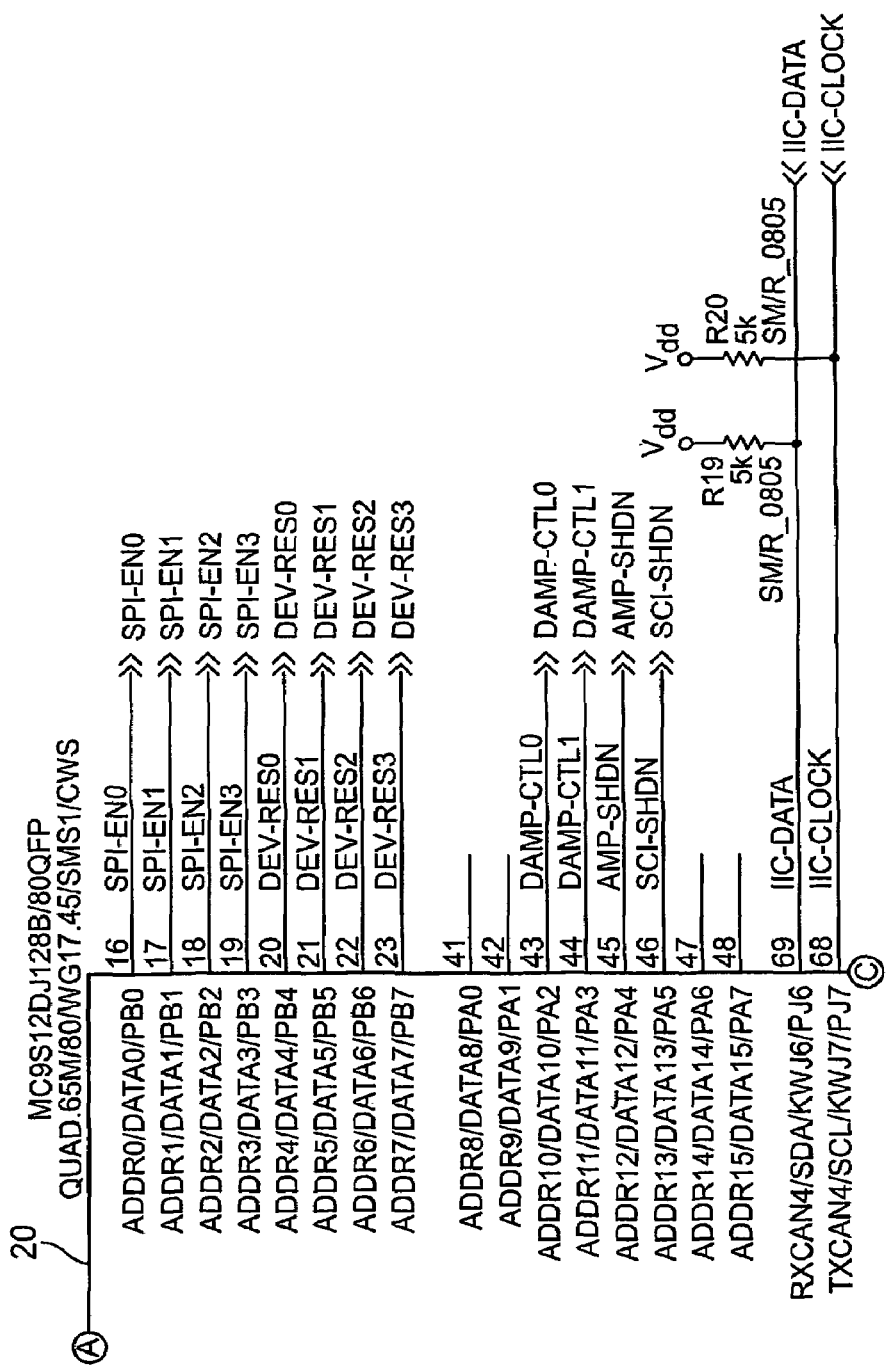

Referring now to the figures, and particularly FIG. 1, a control system for an auxiliary device is shown. The control system may include an after-market type controller 100 (i.e., not OEM equipment) that is provided with an auxiliary device such as a wheelchair lift or ramp for controlling the auxiliary device. One exemplary auxiliary device is illustrated in FIG. 2 as a vehicle wheelchair lift 10, but the auxiliary device may be a wheelchair ramp or other device that helps a mobility-challenged person enter and exit a vehicle, building or other structure. As shown in FIG. 2, by way of example, the wheelchair lift 10 is installed in vehicle V such as a bus, van, or other suitable vehicle. Wheelchair lift 10 is installed in a doorway D and is bolted or otherwise fixedly attached to the vehicle floor F. With reference to the axis shown in FIG. 2, a direction closest to or toward the vehicle V shall be referred to as inboard (IB), whereas the direction away from or farthest from the vehicle V shall be referred to as outboard (OB). The wheelchair lift 10 operates to raise and lower a platform 12 to help a mobility-challenged individual such as a person using a wheelchair, scooter, walker or the like to enter and exit the vehicle V. The individual typically employs the lift 10 with the assistance of an operator who controls the operation of the lift 10.

The individual enters the wheelchair lift platform 12 so that the operator may control the lift 10 to move the platform 12 up and down to transfer the individual between the ground level and the vehicle doorway D, which is known in the art as the transfer level or threshold elevation. As shown in FIG. 2, the wheelchair lift 10 includes several features that help to ensure the safety of an individual employing the lift 10. The safety features include but are not limited to graspable handrails 18, an inboard barrier 16, an outboard barrier 14 and side barriers 20. Other safety features that are not illustrated include a safety belt and a tie-down or the like known in the art for securing a wheelchair to the platform 12. Inboard and outboard barriers 16, 14, which are also known in the art as rollstops, help prevent an individual from accidentally falling off the inboard and outboard sides of the platform 12 when the platform is elevated above the ground level. Further, side barriers 13 cooperate with the barriers 14, 16 to help prevent an individual from accidentally falling off the right and left sides of the platform 12. In addition, the inboard barrier 16 serves as a "bridge plate" to allow the individual to safely move from the platform 12 to the vehicle interior when the platform 12 is raised to the elevated transfer level. Controls for the wheelchair lift 10 may be located within the vehicle V or outside of the vehicle V, and are typically operated by the vehicle driver or operator, but in some cases the user of the auxiliary device may operate the auxiliary device without assistance. Controls for the lift may include switches, buttons or the like that are operable to raise, lower, deploy and stow the platform 12. When the lift 10 is fully stowed, the platform 12 is typically folded and stored within vehicle doorway D in a generally vertical orientation.

Figure 1A:
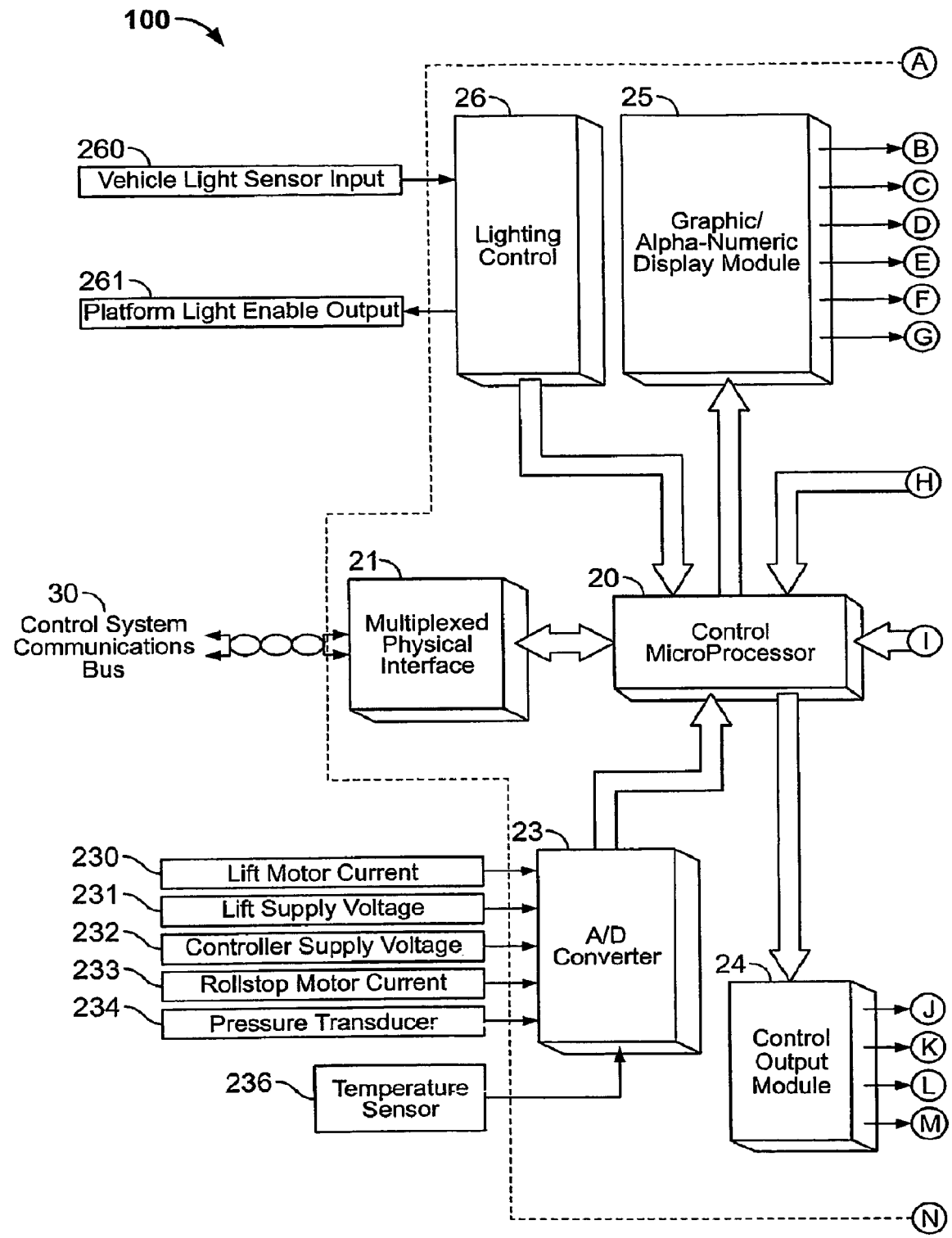
FIGS. 1A-B illustrate a block diagram of an exemplary control system for operating a vehicle auxiliary device.
Figure 1B:
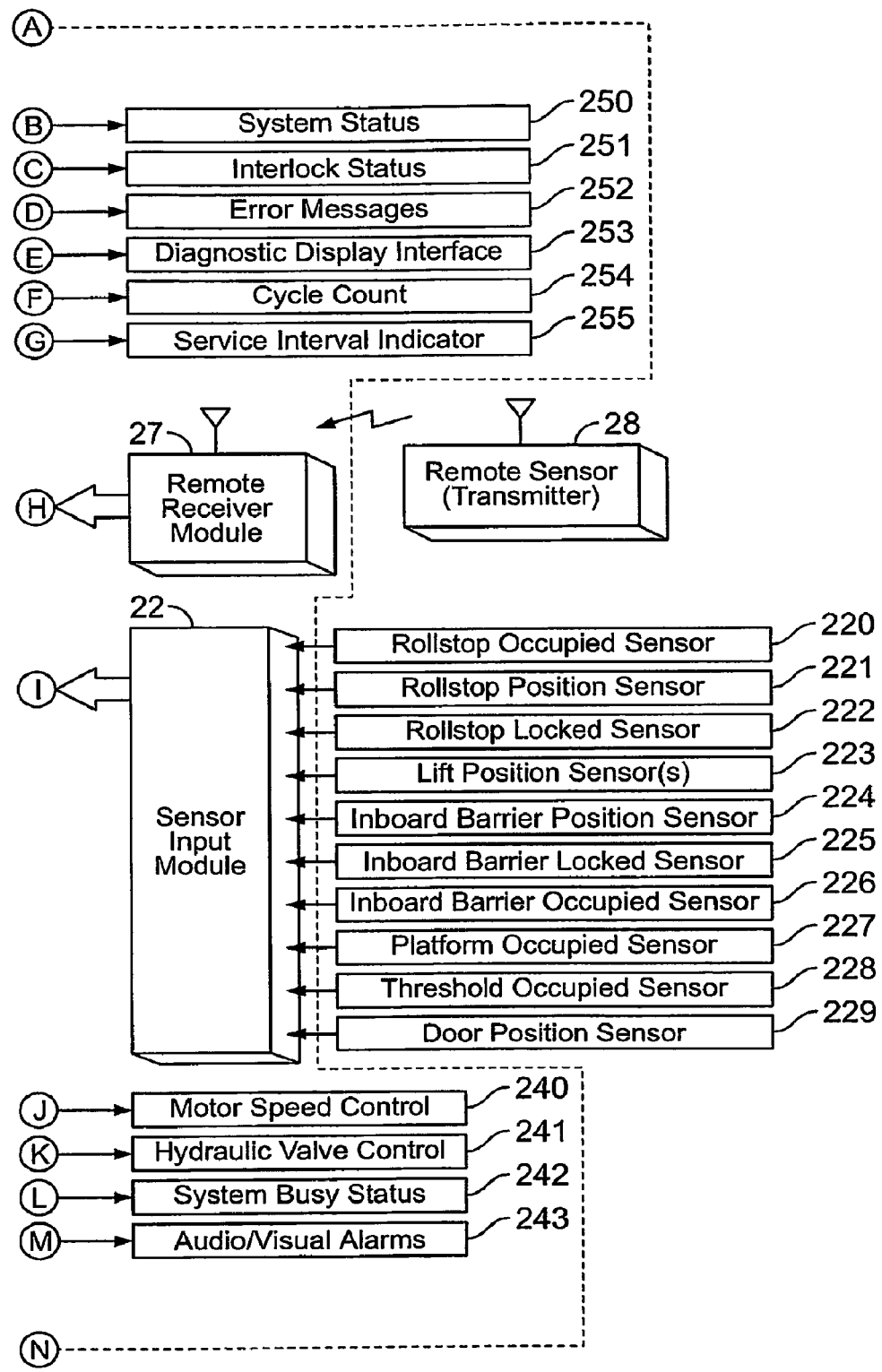

Referring now back to FIGS. 1A-B, a control system for an auxiliary device such as the exemplary wheelchair lift 10 of FIG. 2 is shown. The control system includes a controller 100 comprising a microprocessor 20 that operates under software control to safely control the operation of the auxiliary device relative to a plurality of received inputs including but not limited to control (i.e., operator) inputs and environmental (i.e., sensor) inputs. Although the controller 100 is described hereinafter as comprising a plurality of integrated circuit (IC) chips, particularly a microprocessor 20, the ICs may be substituted with fewer or additional ICs that perform substantially similar functions. For example, the microprocessor 20 may be replaced with a digital signal processing (DSP) IC or other IC or logic device known in the art. As shown in FIGS. 1A-B, a sensor input module 22 may be linked to the microprocessor 20 in order to interface a plurality of sensors with the controller 100 by aggregating the outputs of the sensors and relaying the sensor outputs to the microprocessor 20 for analysis and decision-making. As shown, the plurality of sensors providing outputs to the sensor input module 22 can be categorized as follows: sensors associated with the outboard rollstop 14, sensors associated with the inboard rollstop 16, sensors associated with the platform 12 and sensors associated with the vehicle V. As can be appreciated, rollstop occupancy sensor 220, rollstop position sensor 221 and rollstop lock sensor 222 are associated with the outboard rollstop 14 whereas inboard barrier position sensor 224, inboard barrier lock sensor 225 and inboard barrier occupancy sensor 226 are associated with the inboard barrier 16. Further, lift position sensor 223 and platform occupancy sensor 227 are associated with the platform 12 and threshold occupancy sensor 228 and door position sensor 229 are associated with the vehicle V. As known in the art, the sensors 220-229 may be embodied by switches such as contact microswitches or the like. Alternatively, the sensors 220-229 may be embodied by known devices that operate to discriminate a state change in the associated member (e.g., platform 12, rollstops 14, 16, etc.). As can be appreciated, the sensors 220-229 provide digital or otherwise discrete outputs.

Further, a plurality of analog sensors that provide variable, continuous outputs may provide data to the microprocessor 20 by linking the outputs of the analog sensors to an analog to digital (A/D) converter 23 that is linked with the microprocessor 20. As shown in FIGS. 1A-B, analog sensors may monitor environmental aspects of the auxiliary device (e.g., lift 10 and controller) such as voltage, current, pressure and temperature to ensure that various OEM and auxiliary device subsystems are operating within predetermined specifications or parameters. To this end, the plurality of analog sensors linked with the A/D converter 23 may include: a lift motor current sensor 230, a lift supply voltage sensor 231, a controller supply voltage sensor 232, a rollstop motor current sensor 233, a pressure transducer and a temperature sensor 236.

Moreover, microprocessor 20 is linked with the OEM vehicle controller for receiving outputs from OEM vehicle sensors and other communications between the OEM vehicle controller and OEM vehicle subsystems, among other things. To this end and as shown in FIG. 1, a multiplexed interface module 21 is linked to microprocessor 20 for enabling the microprocessor 20 to communicate with the OEM controller via the OEM communications bus 30. The interface module 21 may communicate with the OEM controller via known communication protocols such as CAN, SAE J1850, LIN and the like. In this way, the microprocessor 20 may operate to intercept an OEM control signal to delay the execution of an OEM subsystem operation until the microprocessor 20 is able to query or otherwise process the output of one or more auxiliary device sensors. Similarly, the microprocessor 20 may operate to delay the execution of an auxiliary device subsystem operation until the microprocessor 20 is able to query or otherwise process the output of one or more OEM sensors. In one example, the controller may cooperate with the OEM vehicle controller to ensure safe deployment of the lift 10 when the vehicle is in a secure state (e.g., transmission in park with parking brake set and door open). Thus, when a lift user or operator requests deployment of the lift 10, the controller may verify the state of a number of OEM subsystems and subsequently take corrective action to correct an incorrect or unsafe subsystem state by controlling the subsystem or alternatively inhibiting the requested deployment and providing a warning or indication. In this way, the controller may operate to coordinate, streamline or otherwise automate safe operation of the OEM and auxiliary device subsystems.

In response to the aforementioned outputs of sensors 220-229, 230-236, microprocessor 20 may output control, status, or informational signals. As shown in FIGS. 1A-B, a control output module 24 is linked to microprocessor 20 to control or actuate various subsystem elements, such as motors, pumps, valves, switches, indicators and the like. As shown, the control output module 24 may be linked or otherwise communicate with: a motor speed control 240, a hydraulic valve control 241, a system busy status indicator 242 and audio/visual alarms or indicators 243. Further, as previously mentioned, since microprocessor 20 is linked with the OEM vehicle controller via multiplex physical interface 21, the microprocessor 20 also operates to control various OEM subsystems such as motors for power sliding doors, solenoid switches and the like.

Additionally as shown in FIGS. 1A-B, microprocessor 20 is linked to a user interface module 25 that provides a user or operator with a means for interacting with the controller 100 for the purpose of receiving information from or providing inputs to the microprocessor 20. As can be appreciated, the user interface module 25 may include a graphical or alphanumeric display that provides an operator or user with status information, messages, error messages, diagnostic displays and the like as well as audible or other sensor indications relative to the status of the auxiliary device and the vehicle V. As shown, the user interface module 25 is linked with: a system status indicator 250, an interlock status indicator 251, an error message indicator 252, a diagnostic display interface 253, a cycle count indicator 254 and a service interval indicator 255. System status indicator 250 may provide a display relative to the controller or auxiliary device environment (e.g., voltages, current, etc.) and interlock status indicator 251 may provide a status display of all lift interlocks which will be discussed in further detail hereinafter. In connection with maintenance and troubleshooting of the controller and auxiliary device, the error message indicator 252 may provide a list of any and all errors detected by the controller during vehicle V and auxiliary device operation (e.g., OBDII codes or translations thereof), the diagnostic display interface 253 may provide a series of help menus such as an interactive menu-driven interface for assisting a technician or operator in troubleshooting or otherwise isolating a fault, the cycle count indicator 254 may display the number of times the auxiliary device has been used (e.g., how many complete lift cycles the lift 10 has completed) and the service interval indicator 255 may display when a predetermined maintenance task is required relative to the cycle count indicator 254, a length of time or other determining factor. Further, a service technician may be able to input information to the controller indicating that a maintenance task has been completed for record keeping. Moreover, the controller may also include a diagnostic interface such as a port or connector that allows a technician to debug the controller, troubleshoot auxiliary device subsystems and exercise auxiliary and OEM subsystem components. By connecting a laptop, dumb terminal, or the like to the diagnostic interface (e.g., an RS232, 9-pin, subminiature "D" connector with standard EIA pinout), a technician may access a menu-driven user interface or the like. Alternatively, a display such as a small LCD may be included in the interface module 25 or otherwise coupled thereto to facilitate communications with the diagnostic interface.

The controller may also include a remote receiver module 27 that is linked to the microprocessor 20 for communicating with wireless devices that cooperate with the controller to provide access to or otherwise control the vehicle V and/or auxiliary device. Remote receiver module 27 may include or otherwise be coupled with an antenna so that it is operable to receive wireless signals (e.g., RF, IR, RFID, etc.) from a remote sensor or transmitter 28. For example transmitter 28 may be a hand controller that operates the lift 10 to deploy, stow, raise and lower the platform 12 by sending wireless control signals to the microprocessor 20 via the receiver module 27. As can be appreciated, since microprocessor 20 communicates with the OEM vehicle controller, transmitter 28 may be operable to actuate OEM subsystem components such as power locks, power sliding doors, a security alarm and the like in addition to actuating auxiliary functions such as deploying, raising and lowering a lift, ramp.

As shown in FIGS. 1A-B, the controller also includes a lighting control module 26. The lighting control module 26 may operate to control a light proximate to or coupled with the auxiliary device for illuminating the auxiliary device or surrounding environment when needed or desired. As shown, the lighting control module 26 may receive an output signal from a light sensor 260 (e.g., a photodetector), which senses low ambient light conditions in the area of the auxiliary device. In response to a sensed low ambient light condition, the lighting control module 26 and microprocessor 20 are operable to output a control signal to an illumination means 261. The light enabling control signal may actuate one or more lights, such as spot or flood lights which thereby illuminate a surface or portion of the auxiliary device (e.g., platform 12) such as throughout the device's range of operation. The lights may be located in and/or on the vehicle, or on the auxiliary device (e.g., lift 10) so that there is illumination of at least 5 lm/sqft on all portions of the surface of the platform 12.

Operation of the exemplary auxiliary device embodied by the wheelchair lift 10 (FIG. 1) relative to the controller 100 is hereafter described in detail. The auxiliary device controller 100 comprising the foregoing modules 21-27 operates under software control of the microprocessor 20 to implement various safety features. One safety feature of the controller prevents an individual from falling out of vehicle V through doorway D when the lift 12 is at an elevation other than the transfer level. To this end, the controller 100 receives an input via sensor input module 22 from both a threshold sensor 228 and a lift position sensor 223. The threshold sensor 228 may include a physically actuated switch such as a pressure sensitive mat or tape, or may alternatively be an electronic sensing means comprising an infrared, ultrasonic, optical, or electric field type sensor. When an individual or other object is sensed in the threshold area, the threshold sensor 228 outputs a signal to the sensor input module 22. The lift position sensor 223 may include one or more sensors on the lift 10 and/or vehicle V to determine the position or elevation of the platform 12 with respect to the vehicle floor F. If the platform 12 is determined by the lift position sensor 223 to be at an elevation other than the vehicle floor F, the sensor 223 is operable to output a signal to sensor input module 22. Having received signals from both sensors 223 and 228, microprocessor 20 may actuate a visual or audible warning until either the lift platform 12 is elevated to the vehicle floor level, or the object or individual exits the threshold area. The microprocessor 20 may actuate audio and/or visual alarms (e.g., alarms 243) through the control output module 24. The visual warning may be a flashing red beacon or the like having a minimum intensity of twenty candela and a frequency from ten to two Hz, which is installed such that it does not require more than plus or minus fifteen degrees side-to-side head rotation as viewed by a user either backing or moving in a forward direction onto the platform from the interior of the vehicle. An audible warning produced by audio alarm 243 may be a minimum of eighty-five dBa, and is between five hundred and three thousand Hz. Moreover, the lift position sensor 223 may be operable to discriminate elevation changes of less than or equal to 1 inch below the vehicle floor F. As is known in the art, the threshold area may be a rectangular space on the vehicle floor defined by the edge of the vehicle floor directly adjacent to the platform through a distance of eighteen inches inboard from the edge across the vehicle floor.

Another safety feature of controller 100 disables the lift 10 from operating if a lift user is improperly positioned on the lift platform 12 before or during a requested lift operation. Such a safety feature is known as an "interlock" in the art. As described hereinafter, the controller 100 includes and operates five interlocks, but fewer or additional interlocks may be provided. Generally, in operating an interlock, the controller 100 receives a user input requesting the activation of an auxiliary device function (e.g., raise, lower, stow, deploy), checks the outputs of one or more sensors relative to the requested function and allows or prevents the activation of the requested auxiliary device function. The controller 100 includes a first interlock that the controller 100 operates to inhibit stowage of the lift 10 when the platform 12 is occupied by a user or other object. If microprocessor 20 receives a user or operator request to stow the lift 10 via a remote transmitter 28 or other user control such as a hand control within the vehicle, microprocessor 20 queries or otherwise communicates with platform sensor 227 via sensor input module 22 to determine the platform occupancy state (i.e., occupied or unoccupied). Platform sensor 227 may comprise a pressure-sensitive tape or mat, infrared, ultrasonic, optical, or electric field sensing means on or near the platform 12 in order to discriminate the presence of an object thereon. Having received a lift stow request, microprocessor 20 delays action on the received request by queuing the request or the like and operates to determine the occupancy state of the platform 12. If microprocessor 20 determines that platform 12 is occupied, the microprocessor 20 may output a signal via control output module 24 to disable the lift 10. For example, the microprocessor 20 via control output module 24 may disable or de-energize a motor driving a hydraulic pump, inhibit the actuation of one or more hydraulic solenoid actuated valves 241, or the like. In addition, the microprocessor 20 may indicate an interlock state via interface module 25 and interlock status display 251, and/or actuation of an audio or visual alarm 243 via control output module 24. Upon removal of the platform object, microprocessor 20 may discontinue actuation of the alarm, and allow stowage of lift 10.

The controller 100 includes a second interlock that the controller 100 operates to inhibit movement of the platform 12 up or down unless the inboard rollstop 16 is deployed. When microprocessor 20 receives an operator request via remote transmitter 28 or other user control such as a hand control within the vehicle to raise or lower the platform 12, the microprocessor 20 may operate to determine the position of the inboard barrier via inboard barrier position sensor 224, and may further determine if the inboard barrier is locked in a deployed (i.e., substantially vertical) position. The inboard barrier position sensor 224 may include a cam and microswitch arrangement or the like to provide an indication of the rotational position of the inboard barrier 16, whereas the inboard barrier lock sensor 225 may include a relay actuated solenoid switch or the like. Additionally, microprocessor 20 may consider the output of lift position sensor 223 when comparing the sensed position of the inboard barrier 16 with a known safe position of the barrier 16. Moreover, to enhance the safety of the lift and prevent a lift occupant from becoming pinned between the platform 12 and vehicle V, the controller may inhibit operation of the lift 10 or provide a visual or audible warning if microprocessor 20 determines that the inboard barrier 16 is in an unlocked position via inboard barrier lock sensor 225. As described above with the first interlock, controller 100 may disable one or more hydraulic or electrical components of the wheelchair lift 10.

The controller 100 includes a third interlock that the controller 100 operates to inhibit deployment of the inboard rollstop 16 if an object is sensed on the rollstop 16. Since a user or mobility device may be tipped, tilted or, at worst, thrown off the lift 10 if the rollstop 16 is moving when occupied (i.e., there is an object present on the rollstop 16), it is important to check the occupancy state of the inboard rollstop 16 via an inboard barrier occupancy sensor 226. Generally, the third interlock is only applicable when the platform 12 is located at the vehicle floor level F and the rollstop 16 is in a generally horizontal, bridging orientation. If the platform 12 is at the vehicle floor elevation for transferring a user from the vehicle to the ground elevation, and the user is positioned on a portion of the platform 12 and inboard rollstop 16, microprocessor 20 operates to verify the output from the inboard barrier occupancy sensor 226 when lift lowering is requested. Thus, if the inboard barrier 16 is determined to be occupied, the microprocessor 20 may, as with the aforementioned interlocks, disable the lowering operation the lift and trigger an audio or visual warning alarm.

The controller 100 includes a fourth interlock that the controller 100 operates, which is somewhat similar to the foregoing third interlock, but is generally concerned with the occupancy state of the outboard barrier rollstop 14. Generally, the fourth interlock is only applicable when the platform 12 is located at the ground elevation and the rollstop 14 is in a generally horizontal orientation. If the platform 12 is at the ground elevation, and the outboard rollstop 14 is in a generally horizontal position, the outboard barrier 14 may become occupied (i.e., there may be an object present on the rollstop 14), prior to raising the platform 12. To prevent a user or object from being tipped off the platform onto the ground, the lift 10 may include various sensors on the platform 12 or the outboard rollstop 14 which are operable to determine the outboard rollstop position (sensor 221), the locked or unlocked state of the outboard rollstop (sensor 222), and the outboard rollstop occupancy state (sensor 220). As with operation of the aforementioned interlocks, microprocessor 20 is operable to receive and process signals from sensors 220, 221, and 222 when a platform raise operation is requested and disable the lift 10 and trigger an audio or visual warning alarm if outboard rollstop 14 is occupied or remains in a generally horizontal position after the platform 12 has been raised a very small predetermined distance (e.g., one inch) from the ground elevation. If the platform 12 has been raised slightly and the rollstop position sensor 221 or lock sensor 222 indicates that the rollstop 14 remains in a horizontal orientation, the controller 100 may operate the lift to lower the platform back to the ground.

The controller 100 includes a fifth interlock that the controller 100 operates to inhibit both raising and lowering movement of the platform 12 unless a wheelchair retention device, such as the outboard rollstop 14, is deployed (i.e., in a generally vertical barrier orientation). As with the second interlock discussed above, when microprocessor 20 receives an operator request via remote transmitter 28 or other wired operator control in the vehicle to raise or lower the platform 12, the microprocessor 20 may determine the position of the outboard rollstop 14 via rollstop position sensor 221, and may also determine if the outboard rollstop 14 is locked in a deployed or substantially vertical position via rollstop lock sensor 222. The rollstop position sensor 221 may include a cam and microswitch arrangement or the like to determine the rotational position of the outboard rollstop 14, whereas the rollstop lock sensor 222 may include a relay actuated solenoid switch or the like. Additionally, microprocessor 20 may consider the output of lift position sensor 223 when comparing the sensed position of the outboard rollstop 14 with a known safe position of the rollstop. Preferably, the controller 100 inhibits the platform 12 from raising more than three inches above the ground when the platform 12 is occupied and the outboard rollstop 14 is in a nondeployed (i.e., horizontal) orientation. For example, the controller, having received a raise operation request, is operative to determine if the platform 12 is occupied, the outboard rollstop 14 position, and whether the outboard rollstop 14 is locked, prior to sensing when the platform 12 has been raised three inches above the ground level or the lowest deployed platform level.

In addition to the foregoing described five interlocks that are generally concerned with providing safe operation of the auxiliary device, the controller 100 may provide other interlock-type safety features that require the controller 100 to interact, control or otherwise communicate with one or more OEM subsystems. For example, the microprocessor 20 may inhibit deployment of the lift 10 if the vehicle door is closed or not fully open. In a further example, the microprocessor 20 may prevent the user from closing the vehicle door if the lift 10 is deployed.

In addition to the aforementioned safety features, controller 100 is operable to monitor the operation of the auxiliary device to ensure that the device and its subsystems are operating consistently within predetermined operating specifications or parameters. To prevent user injury and lift damage due to undesirable stress on lift components, the controller 100 is operable to monitor lift velocity (i.e., speed) and acceleration during requested operations (e.g., stow, deploy, raise, lower). For example, throughout the range of passenger operation (i.e., occupied operation of the auxiliary device) it is important that both the vertical and horizontal velocity of the platform be less than or equal to a predetermined safe speed such as six inches per second. In a further example, during stow and deploy operations of the auxiliary device (i.e., when the auxiliary device is unoccupied), both the vertical and horizontal velocity of any portion of the lift should be less than or equal to a second safe speed that may be greater than or equal to the first safe speed, for example, twelve inches per second. Further, it is desirable that the acceleration of the auxiliary device be less than or equal to 0.3 G. To monitor the velocity and acceleration of the lift 10, various sensors may be employed, including lift motor current and voltage sensors, accelerometers, and motor shaft speed or torque sensors that may communicate with a motor speed control 240, such as a pulse width modulation (PWM) type module to effect feedback motor control. Sensors 230-234 in connection with A/D converter 233 enable microprocessor 20 to monitor and control operation of the lift 10 within such foregoing predetermined operating specifications. For example, if the lift speed or acceleration are determined to be outside of an acceptable range, microprocessor 20 may output a signal via control output module 24 to vary the output of motor control 240 or hydraulic components, such as a hydraulic valve 241. Additionally, microprocessor 20 may be operable to limit the operating noise of the lift by use of the motor control 240. Moreover, motor control 240 may effect soft starts and stops of a motor such as one used in a hydraulic power unit thereby allowing for smooth, consistent, and quiet operation of the lift 10.

In monitoring system operations, the controller 100 may advantageously assist the operator or technician if and when system malfunctions occur. User interface module 25 includes one or more status indicators 250 that displays the state of the lift 10 (e.g., on, off). The status indicator 250 may include incandescent or LED indicator lights which illuminate relative to a master on-off switch, button or the like. Further, the microprocessor 20 may illuminate the one or more status indicators 250 with varying intensities during sensed low ambient light conditions to distinguish between important and unimportant indicators. To this end, the microprocessor 20 is operable through the multiplex interface module 21 to sense when the vehicle's headlights are illuminated and in response to a user or operator illuminating the vehicle's headlights, or the vehicle light sensor 260 (e.g., photodetector) detecting a low light condition, the microprocessor 20 may illuminate one or more of indicators 250 through 255 as desired or appropriate.

User interface module 25 also includes a status indicator for the above mentioned interlocks. The interlock status indicator 251 may include one or more indicators (e.g., visual and/or audible indicators) that are actuated in response to an interlock condition. In addition, user interface module 25 includes an operations counter or cycle count indicator 254. Cycle count indicator 254 records each complete raise/lower operation of the lift 10 to provide a general indication of lift usage and remaining useful life. Relative to the cycle counter 254, the user interface module 25 may include one or more service interval indicators 225. Service interval indicator 225 may be operable to indicate one or more recommended service or maintenance items to an operator or user based on the cycle count of the lift. For example, microprocessor 20 may actuate the service interval indicator 225 via user interface module 25 when a predetermined lift count is reached or exceeded. The service interval indicator 225 may display a static message (e.g., lift service recommended), or may indicate one or more specific subsystems for which preventative maintenance is recommended (e.g., check hydraulic power unit). In addition to the foregoing, user interface module 25 may include a diagnostic display interface 253 and an error message display 252. Error message display 252 may enable an operator or user to perform basic maintenance to the lift 10, or may indicate specific faults or failures within the system that require repair or replacement by a technician. As mentioned above, the diagnostic display interface 253 may help or enable a technician to perform troubleshooting with the assistance of a menu-driven interface display or the like.

Figures 3, 3A:
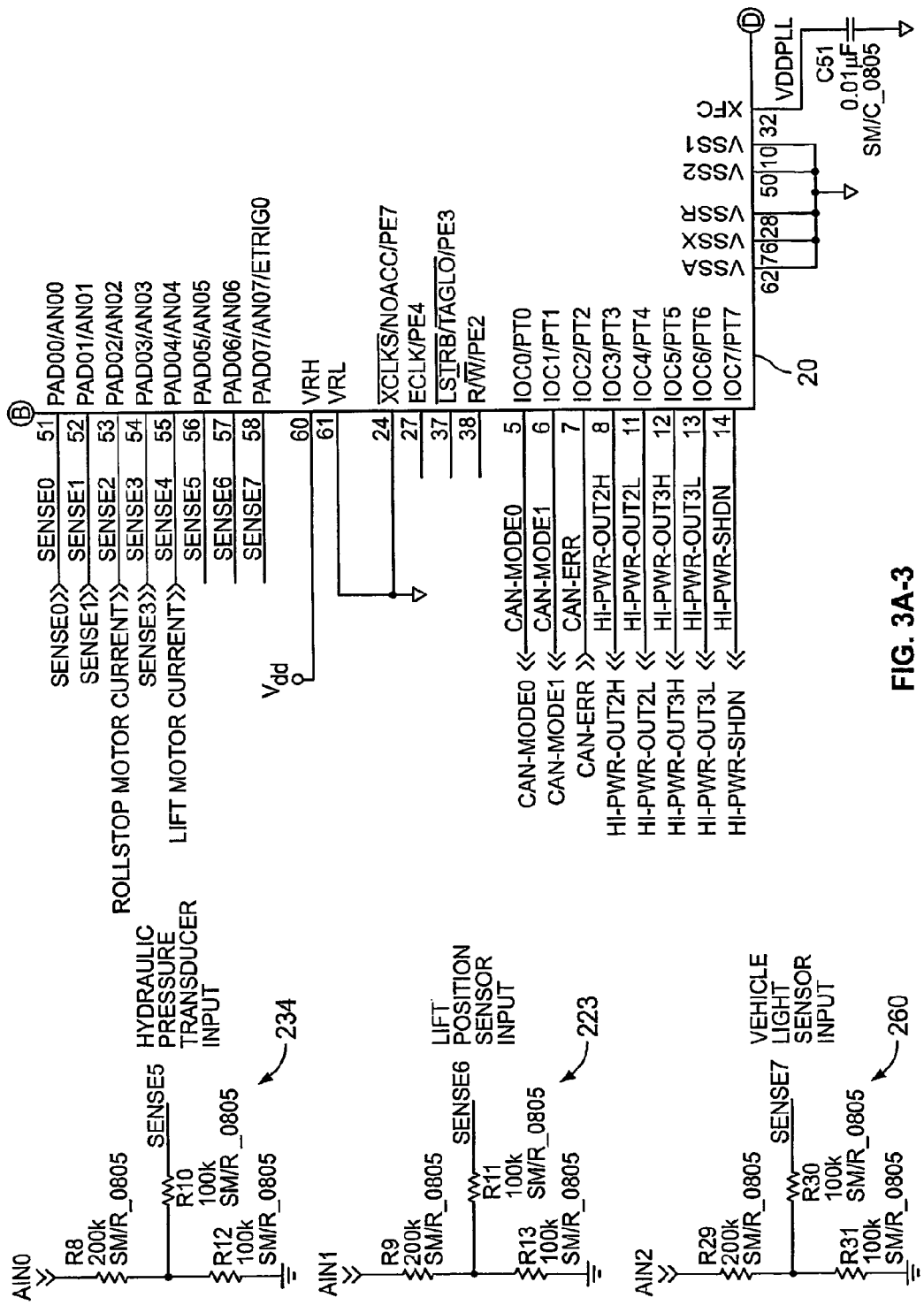
Figures 3, 3A, 4:
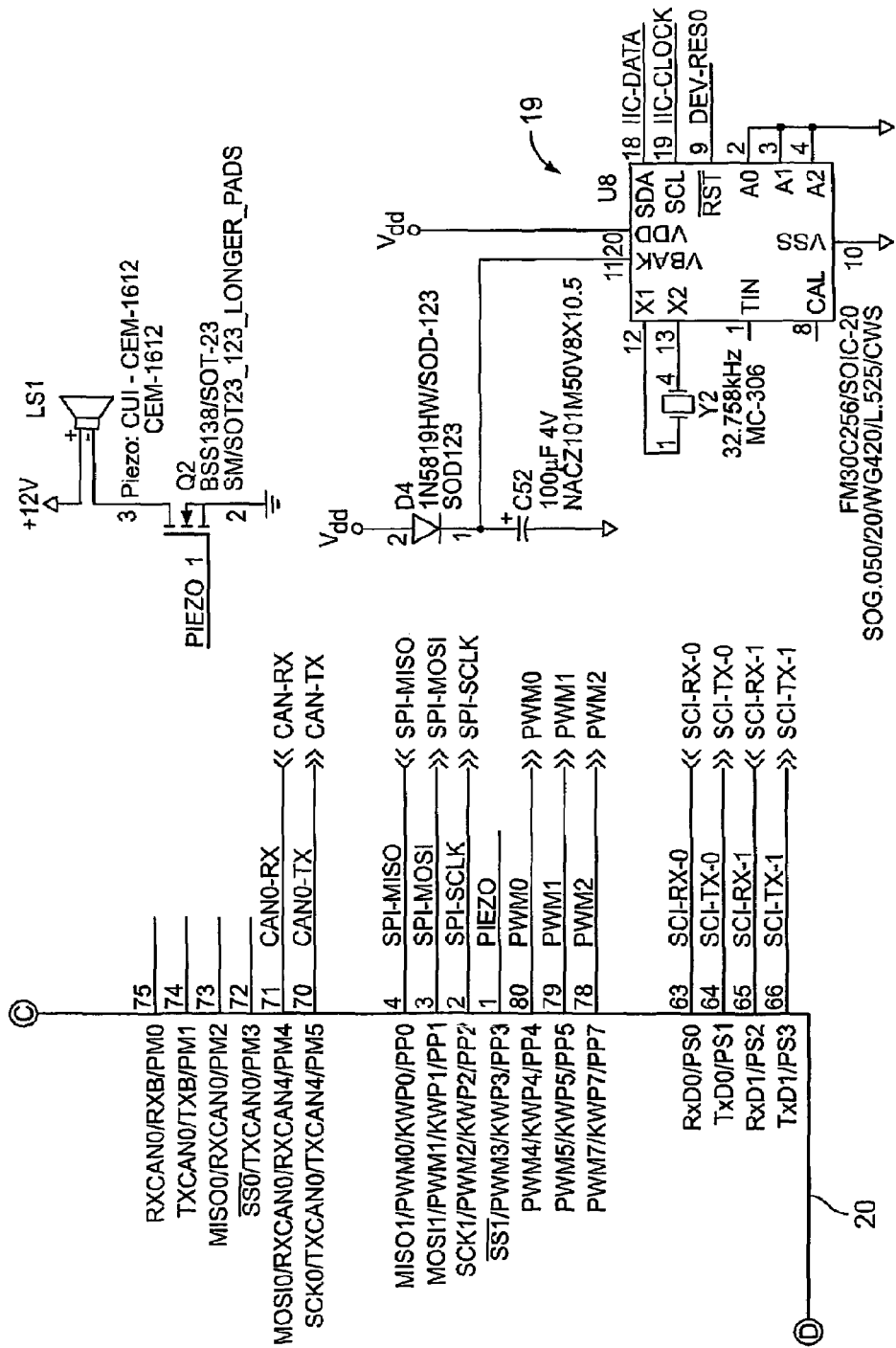
Figures 1, 3B:
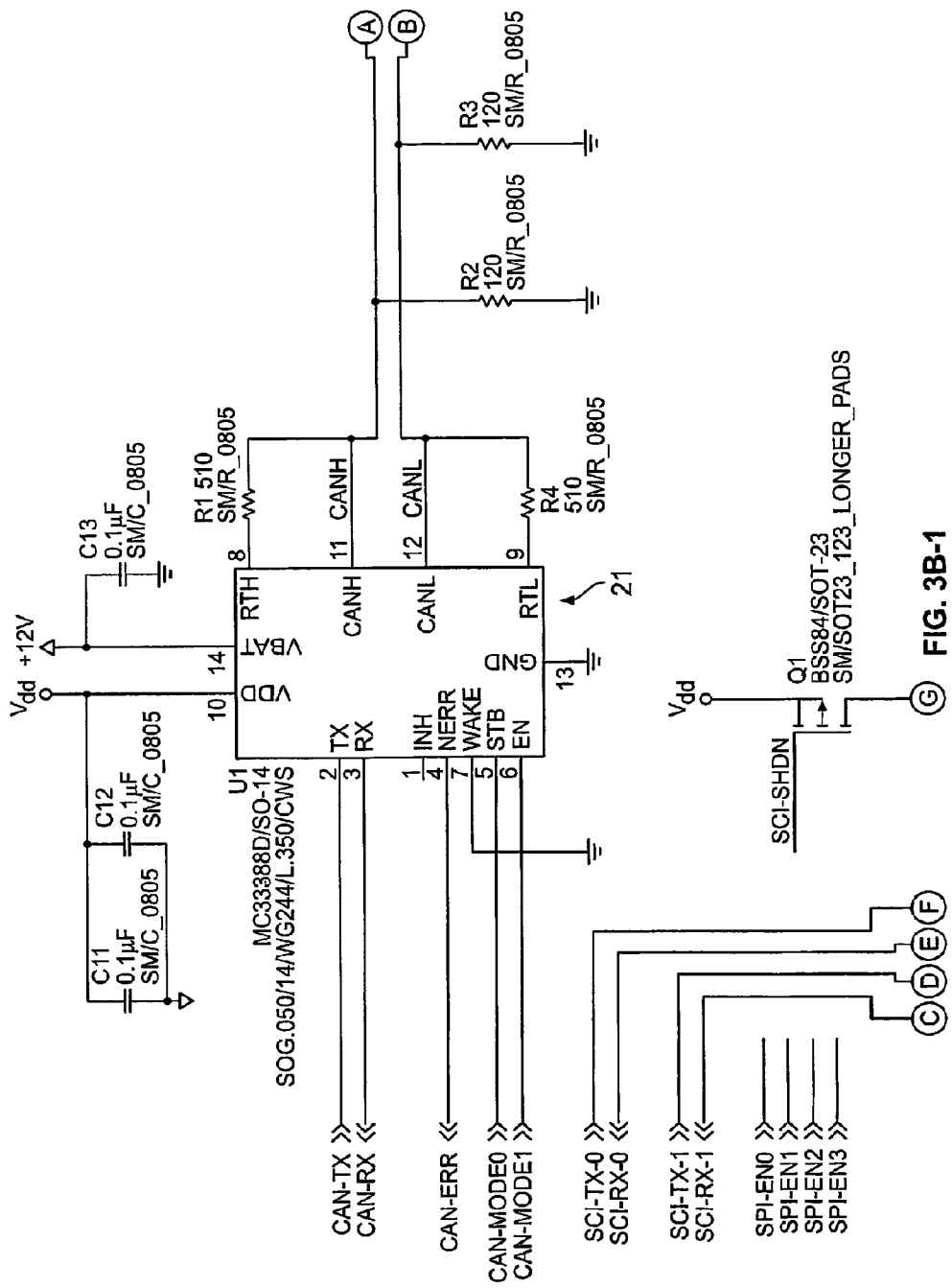
Figures 2, 3B:
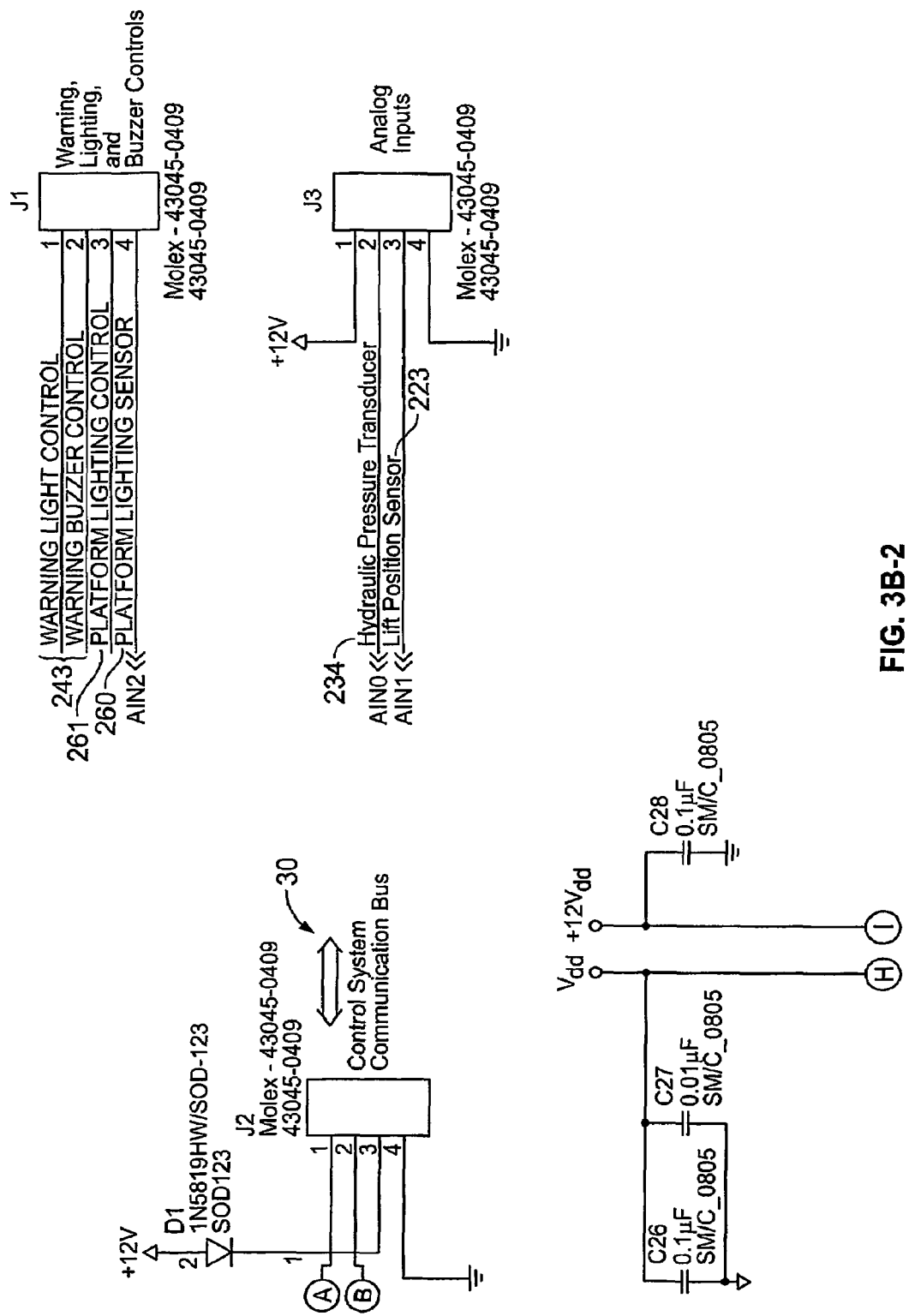
Figures 3, 3B:
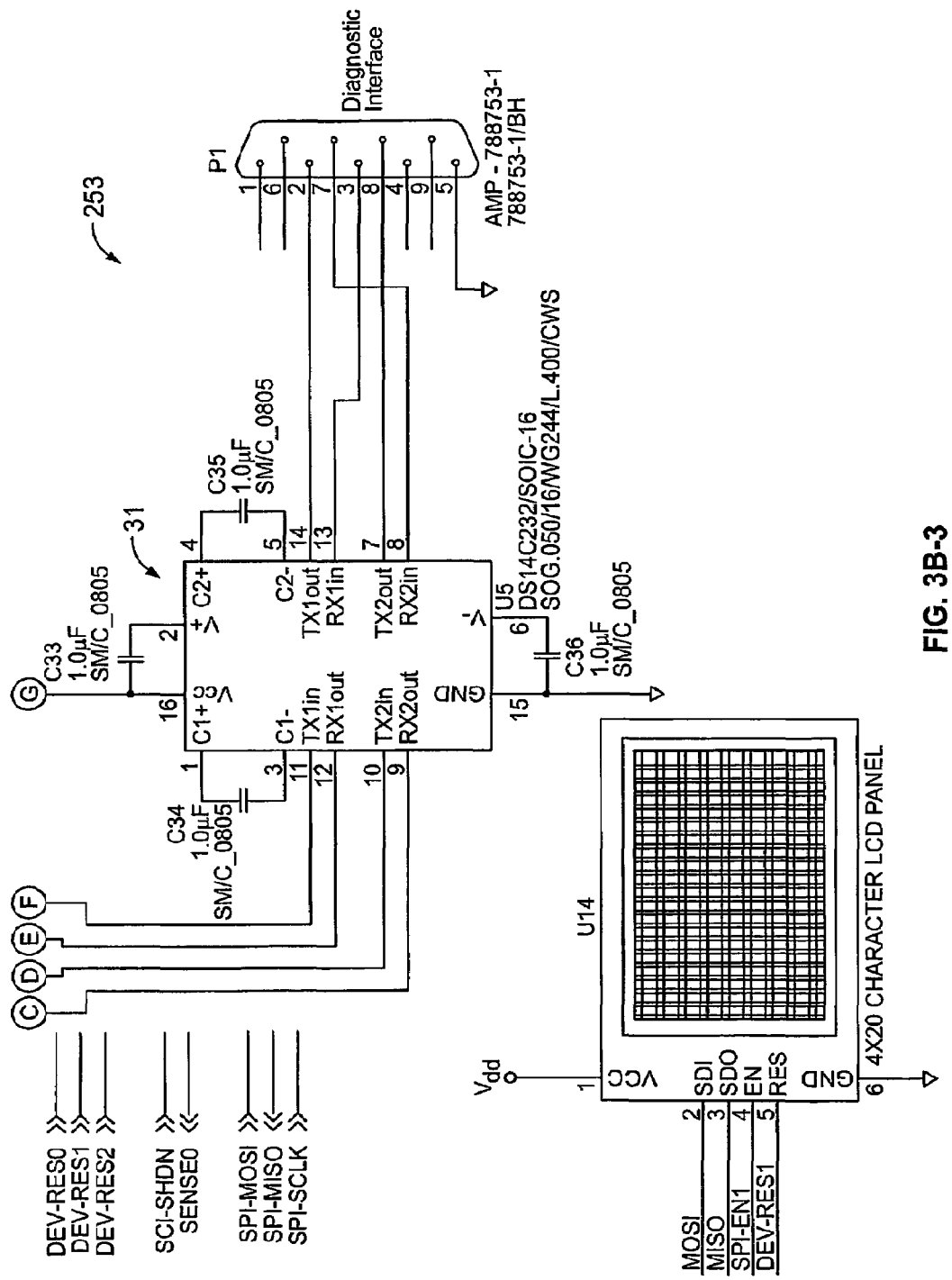
Figures 3, 3B, 4:
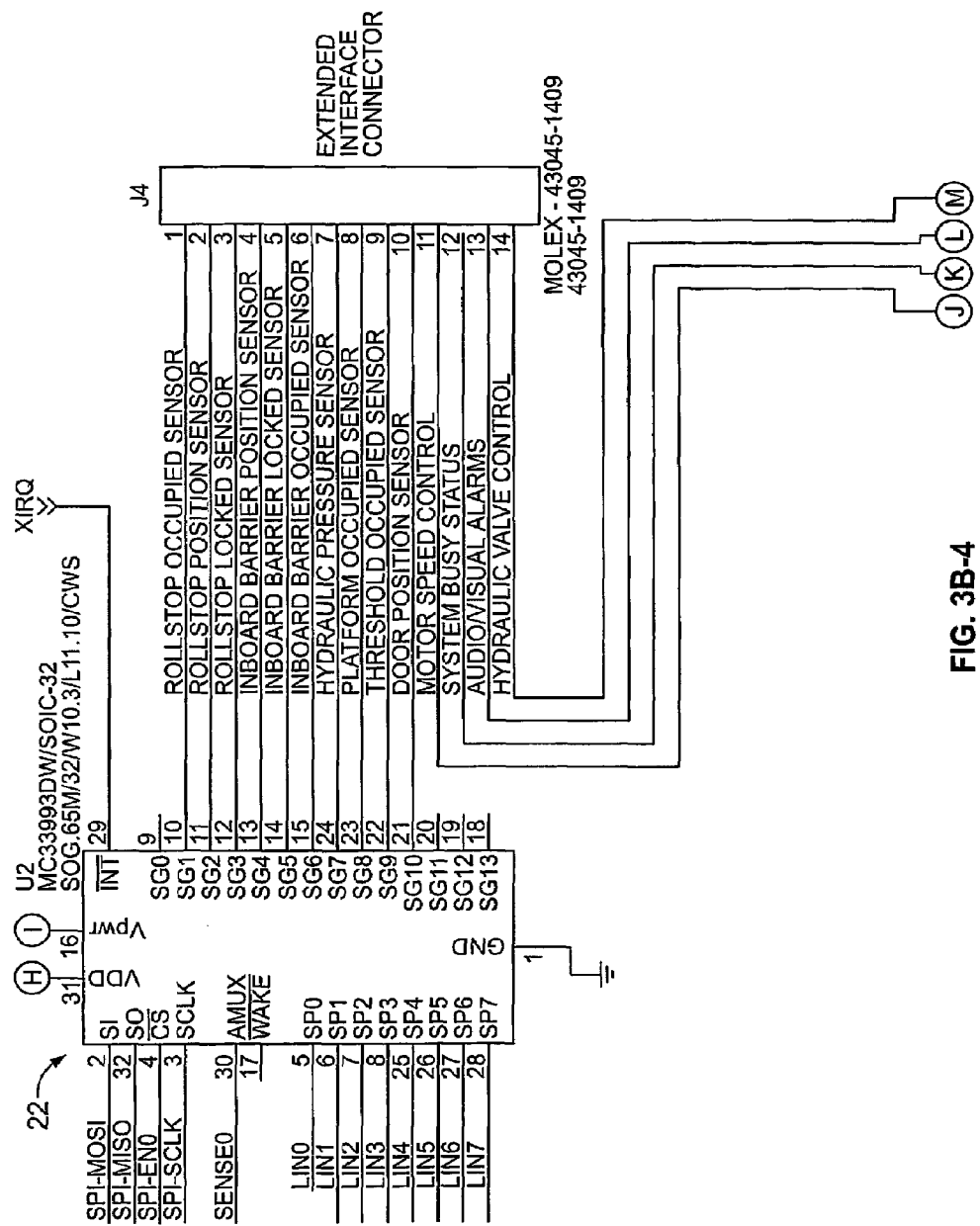
Figures 3, 3B, 4, 5:
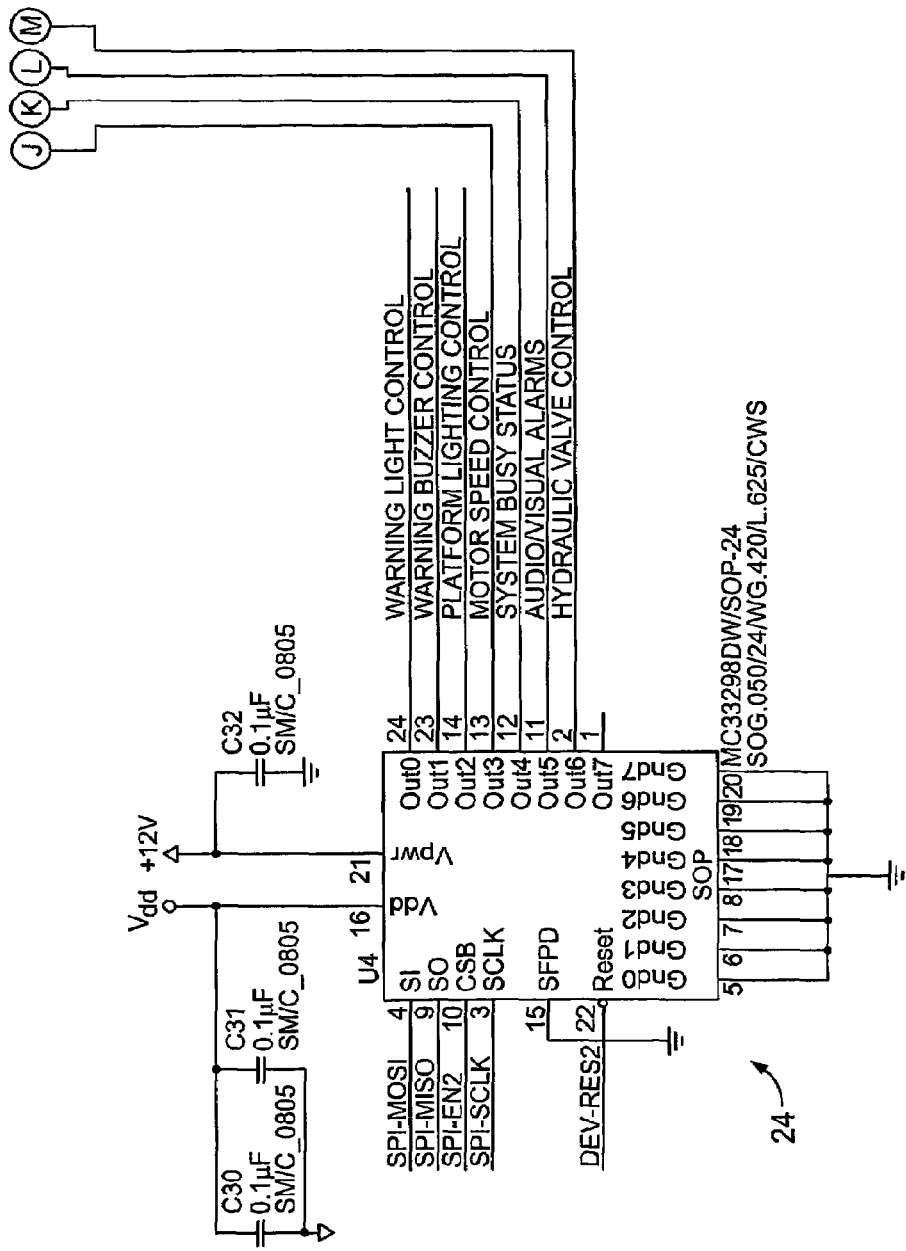
Figures 1, 3C:
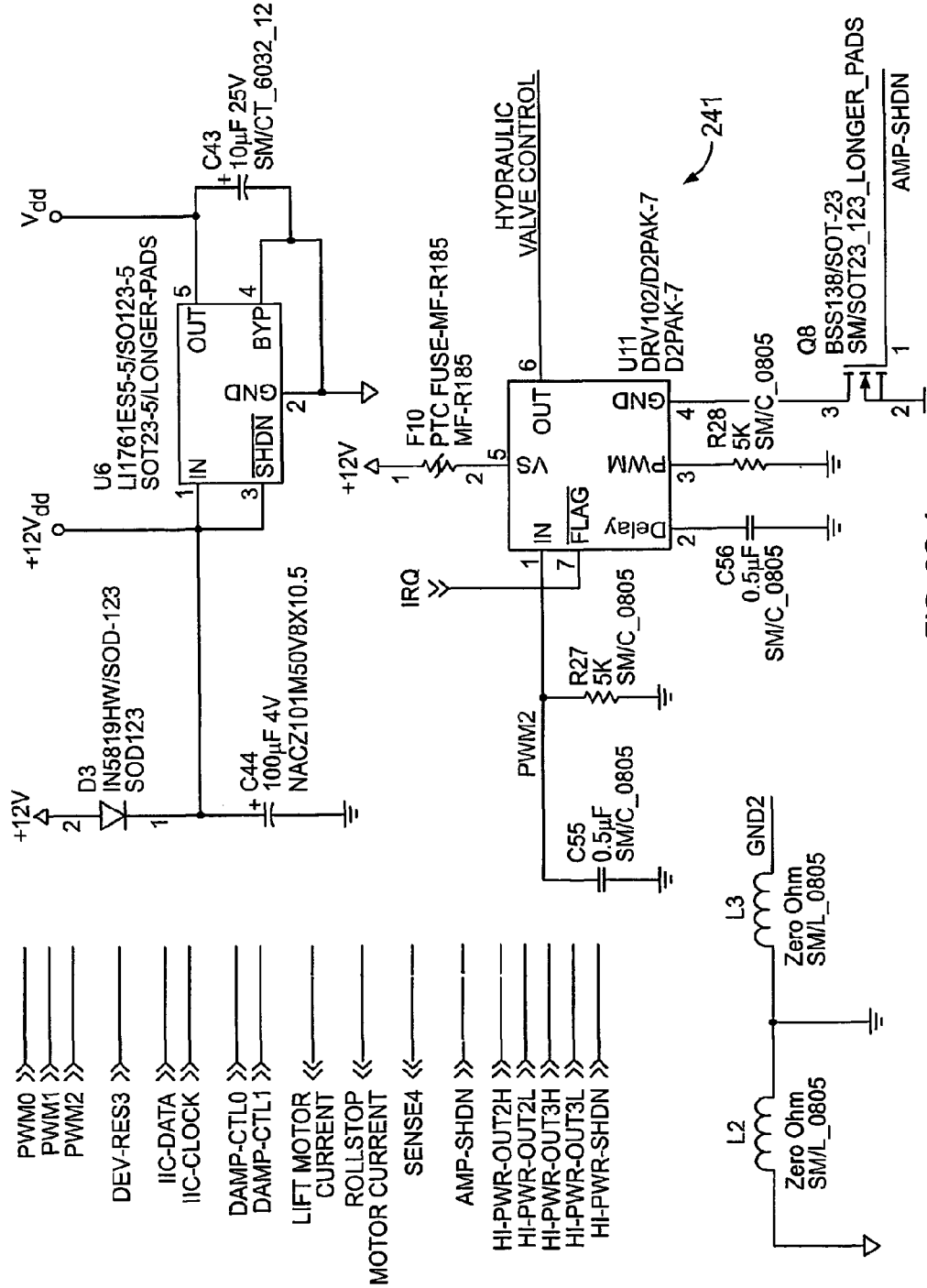
Figures 2, 3C:
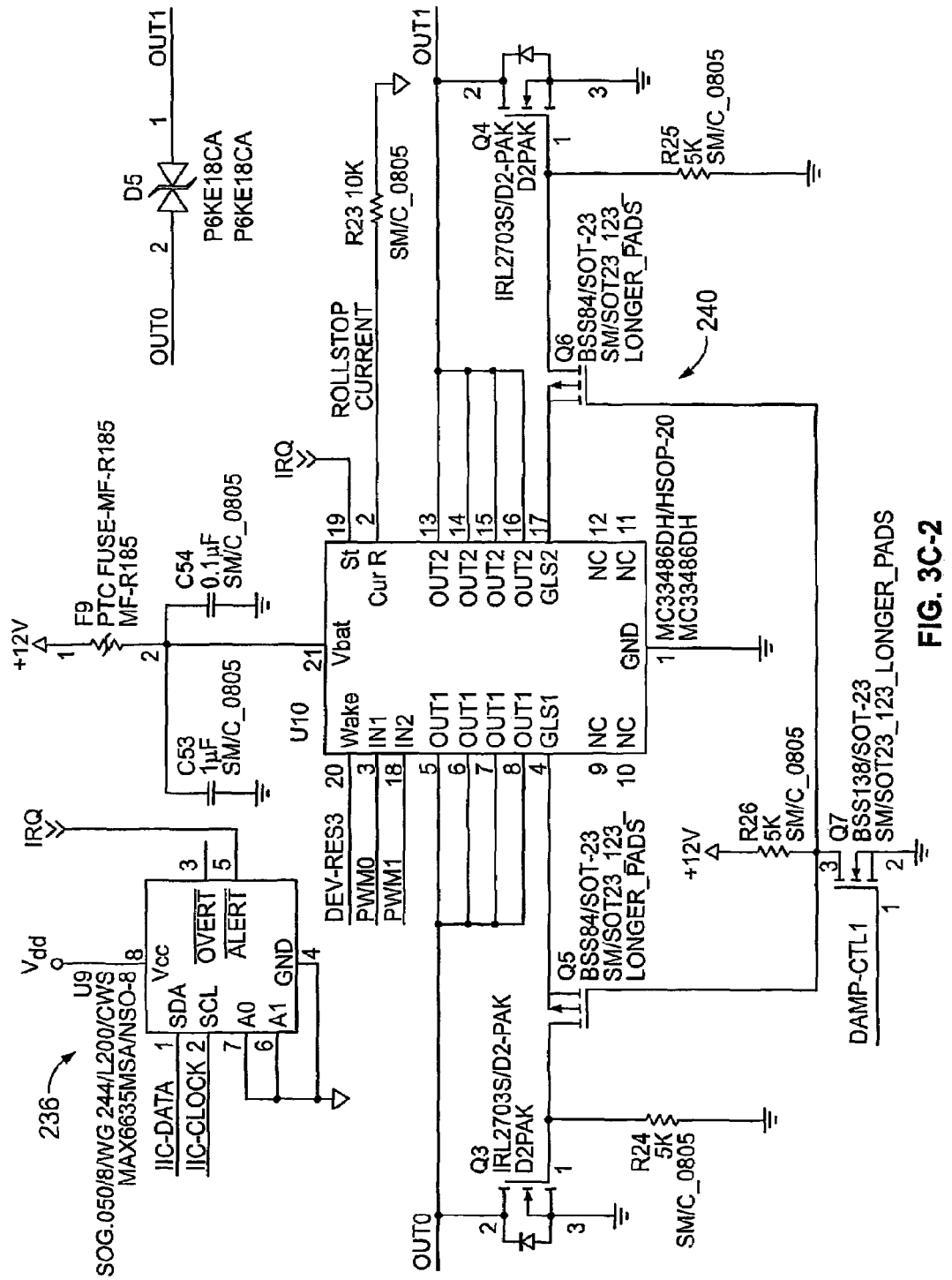
Figures 3, 3C:
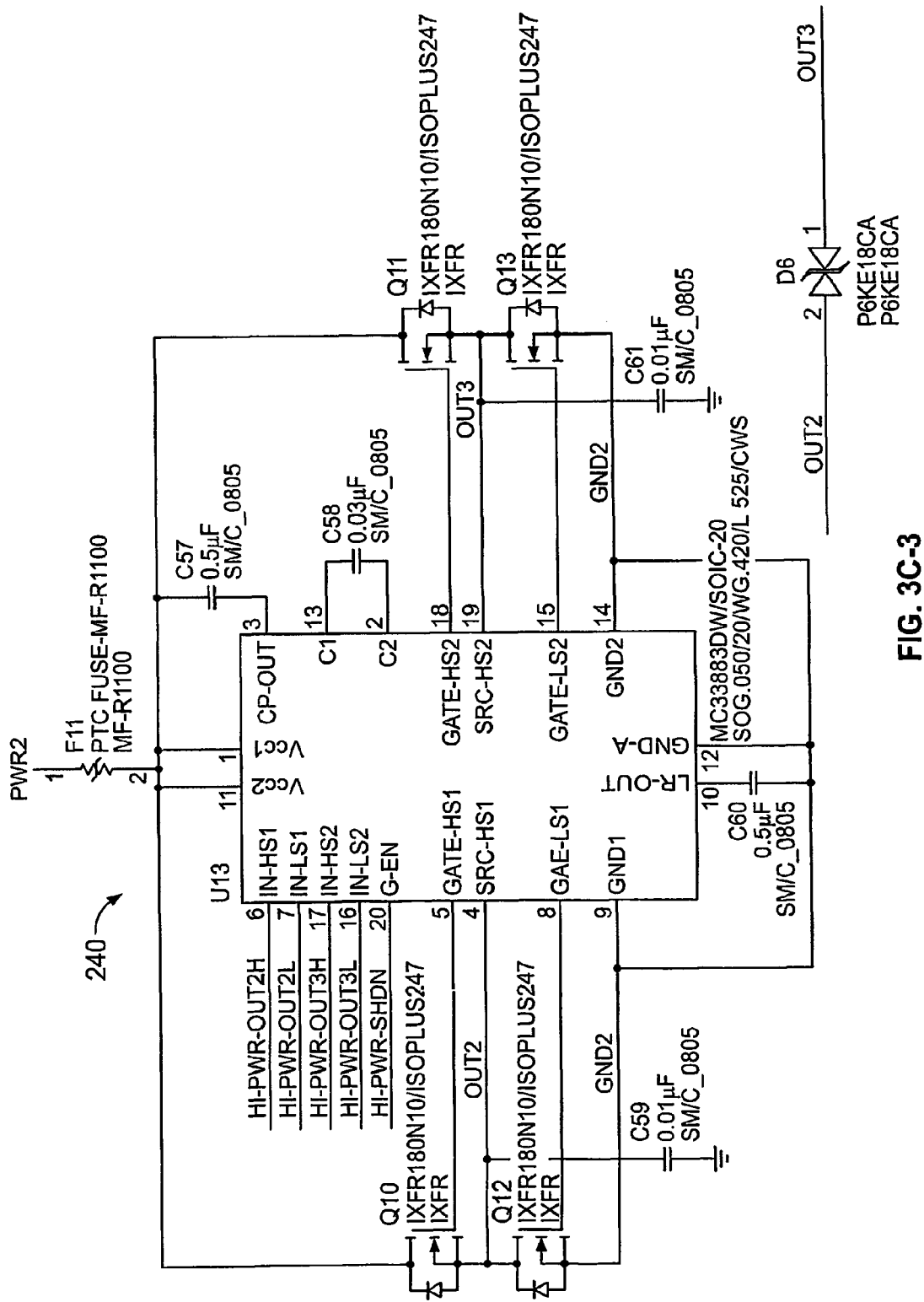
Figures 3, 3C, 4:
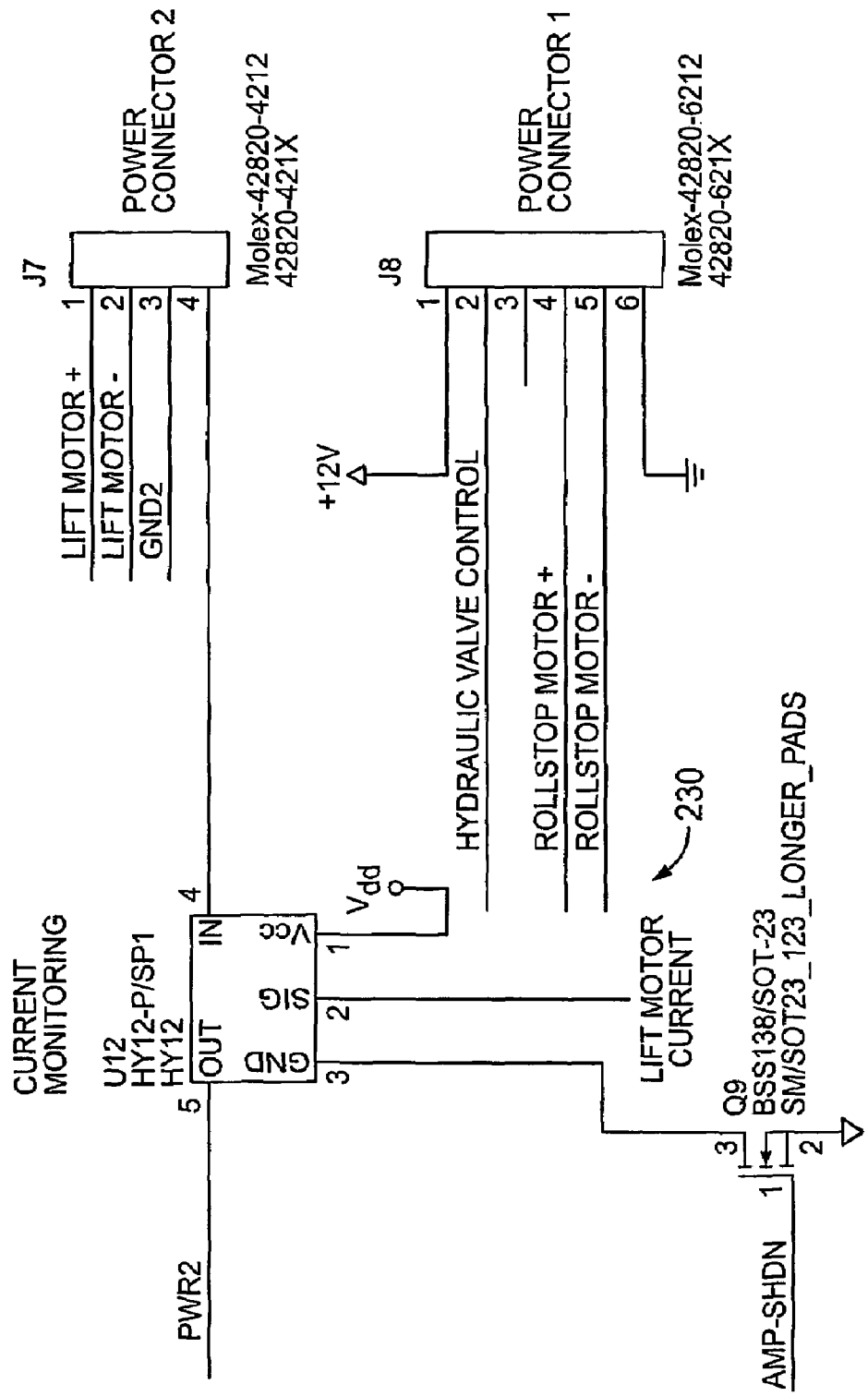

Referring now to FIGS. 3A-C, an electrical circuit schematic illustrating one exemplary embodiment of the controller of FIGS. 1A-B is shown. It will be readily understood by a person knowledgeable in the art that the illustrated components and electrical connections of FIGS. 3A-C are provided for exemplary purposes only and that other suitable components and interconnections may be provided. As can be appreciated, the controller 100 may be embodied by a "black box" that includes a number of connectors for interfacing with various OEM and auxiliary device subsystems such that the controller 100 is a "plug and play" type module. As shown in FIGS. 3A-1 through A-4, one exemplary microprocessor 20 is a Motorola MC9S12DG128B 16-bit microcontroller unit (MCU) composed of standard on-chip peripherals, but other suitable integrated circuit (IC) modules may be substituted. Software running on the microprocessor 20 effects control outputs relative to a plurality of received inputs. The microprocessor 20 communicates with an OEM interface module 21 comprising a Motorola MC33388 (FIG. 3B-1), but other suitable communication interface modules known in the art may be substituted. The MC33388 is a CAN physical interface device, dedicated to automotive body electronic multiplexing applications. As shown in FIGS. 3B-1 and 3B-1, the MC33388 is connected to the vehicle OEM communications bus 30 with a suitable connector. As shown in FIG. 3B-4, a switch detection module 22 comprising a Motorola 33993DW is linked to a plurality of sensors as shown. As known in the art, the Motorola 33993 is designed to detect the closing and opening of up to twenty-two switch contacts, however other suitable ICs or circuit modules may be provided for controlling fewer or additional switch contacts or other elements. As shown in FIG. 3B-5, the control output module 24 comprising a Motorola MC33298DW is operatively linked to control various status indicators and the like. The MC33298 is an octal series switch comprising interfaces directly with a MCU to control various inductive (e.g., relays, solenoids, switches) or incandescent loads.

The user interface module 25 of FIGS. 1A-B may comprise a 4×20 character LCD panel as shown in FIG. 3B-2 for displaying various status messages and indications. However, the user interface module 25 may comprise other types of displays known in the art such as TFT or the like. Additionally as shown in FIG. 3B-3, a diagnostic interface 31 embodied by an RS232 interface is illustrated to be operatively linked with the microprocessor 20 to allow an individual to troubleshoot the controller 100 and one or more OEM and auxiliary subsystems. The RS232 interface 31 comprises a Dallas Semiconductor DS14C232 module and 9-pin subminiature "D" interface for connecting a personal computer, dumb terminal, display terminal, laptop or the like with the controller. As shown in FIG. 3A-4, the controller 100 may include a multipurpose data storage/clock/calendar module 19. As shown, this module 19 comprises a Ramtron FM30C256 which is a 256 Kb data collection subsystem including nonvolatile RAM, and timekeeping and time-stamp functionality.

Referring now to FIG. 3C-1 through 3C-4, one or more voltage regulators may be linked to the microprocessor 20 to regulate voltage to the controller 100 and the auxiliary device and/or its subsystems. As shown, one exemplary voltage regulator comprises a LT1761ES5-5 low noise, low dropout regulators that provide reverse battery protection, current limiting, thermal limiting and reverse current protection available from the Linear Technology company. Further as shown, a current transducer, embodied by a HY12 available from the LEM company, operates to monitor the current of the lift motor for reporting to the microprocessor 20. Moreover, temperature sensor 236 comprising a Maxim MAX 6635MSA may be operatively linked to the microprocessor 20 to sense over-temperature conditions and output a shutdown signal relative to, for example, the auxiliary device motor (not shown). A hydraulic valve controller 241 is operatively linked to the microprocessor 20 to control operation of one or more hydraulic valves. As shown in FIG. 3C-1, one exemplary valve controller 241 comprises a Burr-Brown DRV102 high-side, bipolar power switch employing a PWM output for driving electromechanical and thermal devices (e.g., solenoids, positioners, contactors, etc.). Additionally, one or more driver circuits may be operatively linked to the microprocessor 20 to control the operation of motors such as a rollstop motor, lift motor, and the like. As shown in FIGS. 3C-2 and 3C-3, the motor control 240 may include exemplary integrated circuits (ICs) such as the Motorola MC33883 full bridge pre-driver and the Motorola MC33486 dual high side switch for H-bridge automotive applications.

The use of any and all examples, or exemplary language (e.g., "such as") provided herein, is intended merely to better illuminate the invention and does not pose a limitation on the scope of the invention unless otherwise claimed. Exemplary embodiments of this invention are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control system for an auxiliary vehicular access device, the control system comprising:
 a communication bus for carrying communication signals between a plurality of vehicle components;
 a vehicle controller coupled to the communication bus;
 a power sliding door subsystem operable to open and close a vehicle door in response to at least one of the communication signals;
 an access device moveable between stowed and deployed positions;
 an access controller coupled to the access device for controlling movement of the access device between the stowed and deployed positions, and coupled to the communication bus, wherein the access controller delays operation of at least one of the power sliding door subsystem and the access device until the other of the power sliding door subsystem and the access device is in an appropriate state.

2. The control system of claim 1, wherein the access controller intercepts an OEM control signal to delay operation of the power sliding door subsystem.

3. The control system of claim 2, wherein the OEM control signal is carried by the communication bus.

4. The control system of claim 1, wherein the power sliding door subsystem provides a door status output corresponding to whether the vehicle door is open or closed, and the access device provides an access device status output corresponding to whether the access device is stowed or deployed.

5. The control system of claim 4, wherein the controller processes the door status output and the access device status output to determine whether to delay operation of the power sliding door subsystem or the access device.

6. The control system of claim 5, wherein the controller processes the door status output and the access device status output in response to a request to move at least one of the door and the access device.

7. The control system of claim 6, wherein the request to move at least one of the door and the access device comprises a selected one of the communication signals carried by the communication bus.

8. The control system of claim 4, wherein the power sliding door subsystem includes a door sensor that provides the door status output, wherein the access device includes an access device sensor providing the access device status output, and wherein the door status output and the access device status output are discrete outputs communicated to the access controller via an input module.

9. The control system of claim 4, wherein in response to a request to deploy the access system, the access controller processes the door status output and if the door status output indicates that the door is closed, the access controller controls the power sliding door system via the communication bus to open the door while delaying operation of the access device.

10. The control system of claim 4, wherein in response to a request to close the vehicle door, the access controller processes the access device status output and if the access device status output indicates that the access device is deployed, the access controller stows the access device while operation of the power sliding door subsystem is delayed.

11. The control system of claim 1, wherein the communication bus operates using a communication protocol.

12. The control system of claim 1, wherein the access controller is coupled to the communication bus via a multiplexed interface module.

13. The control system of claim 1, wherein the communication signals include commands and status signals for the plurality of vehicle components, and wherein the access controller monitors the communication bus for at least one of the communication signals and interprets the at least one of the communication signals as a request to operate both the vehicle door and the access device.

14. The control system of claim 1, wherein the vehicle controller and the access controller communicate with each other and at least some of the plurality of vehicle components by sending and receiving communication signals via the communication bus.

15. A method of installing an access device in a vehicle to provide access to the vehicle while coordinating operation between the access device and at least one vehicle subsystem, the method comprising:

providing a vehicle including a door subsystem that opens and closes a vehicle door, the door subsystem operating in response to vehicle communications sent from a vehicle controller, the vehicle communications sent via a communication bus;

installing the access device in the vehicle for passenger egress and ingress to the vehicle through the vehicle door, the access device moveable between stowed and deployed positions;

providing an access controller having at least one communication interface;

coupling the communication interface to the communication bus for receiving the vehicle communications;

coupling the access controller to the access device to control stowing and deploying of the access device, and for determining whether the access device is stowed; and programming the access controller to delay execution of operation of the door subsystem when the access device is not stowed.

16. The method of claim 15, wherein coupling the communication interface to the communication bus for sending and receiving vehicle communications includes coupling the communication interface to the communication bus for receiving vehicle communications corresponding to requests to open and close the door.

17. The method of claim 15, wherein coupling the communication interface to the communication bus includes coupling the access controller to intercept an OEM control signal to delay execution of operation of the door subsystem.

18. The method of claim 15, wherein providing an access controller includes providing an access controller having discrete inputs and outputs, and wherein coupling the access controller to the access device includes coupling at least one of the discrete inputs and outputs to the access device.

19. The method of claim 18, further comprising coupling at least one of the discrete inputs to the vehicle.

20. The method of claim 19, wherein coupling the at least one of the discrete inputs to the vehicle includes coupling the access controller to intercept an OEM control signal to delay execution of operation of the door subsystem.

21. The method of claim 15, further comprising coupling at least one of the discrete inputs to a door sensor that provides a signal corresponding to a position of the door.

22. The method of claim 21, wherein programming the access controller to intercept an OEM control signal includes programming the access controller to intercept an OEM control signal that is carried on the communication bus.

23. The method of claim 22, further comprising programming the controller to correct the status of the door subsystem by controlling the door subsystem to open the door before deploying the access device.

24. The method of claim 22, further comprising programming the controller to provide a warning if the status of the door subsystem is incorrect.

25. The method of claim 15, wherein programming the access controller to delay execution of operation of the power sliding door subsystem includes programming the access controller to intercept an OEM control signal that would otherwise allow the sliding door subsystem to close the door.

26. The method of claim 15, further comprising programming the controller to delay execution of an operation to deploy the access device while verifying a status of the door subsystem.

27. The method of claim 15, wherein the vehicle communications include a plurality of commands and status signals carried between a plurality of vehicle components, the method further comprising programming the controller to monitor the vehicle communications for a selected one of the vehicle communications corresponding to a command to operate the door, and programming the access controller to control operation of both the door subsystem and the access device in response to the selected one of the vehicle communications.

28. A control system for an auxiliary vehicular access device, the control system comprising:
- a communication bus associated with the vehicle and coupled to a plurality of vehicle components for carrying communication signals between the plurality of vehicle components, the plurality of vehicle components operable to send and receive the communication signals using a communication protocol, the plurality of vehicle components including:
  - a vehicle control module; and
  - a power sliding door subsystem operable to open and close a vehicle door in response to at least one of the communication signals, the at least one of the communication signals sent by the vehicle control module;
- an access device installed in the vehicle to provide ingress and egress through the vehicle door, the access device moveable between stowed and deployed positions and including an access device sensor that indicates whether the access device is stowed or deployed;
- an access controller installed in the vehicle to coordinate operation between at least the access device and the power sliding door subsystem, the access controller coupled to the access device for controlling movement of the access device between the stowed and deployed positions, and for communicating with the access device sensor to determine whether the access device is stowed, the access controller also coupled to the communication bus for communication with the vehicle controller and the power sliding door subsystem, wherein the access controller intercepts a control signal to delay operation of at least one of the power sliding door subsystem and the access device when the other of the power sliding door subsystem and the access device is in an incorrect state to thereby prevent interference between the vehicle door and the access device, and wherein the access controller operates the other of the power sliding door subsystem and the access device to correct the incorrect state while delaying operation of the at least one of the power sliding door subsystem and the access device.

29. The control system of claim 28, wherein the control signal is carried by the communication bus.

30. The control system of claim 28, wherein the power sliding door subsystem provides a door status output corresponding to whether the vehicle door is open or closed, and wherein the controller processes the door status output and communicates with the access device sensor to determine whether to delay operation of the power sliding door subsystem or the access device.

31. The control system of claim 30, wherein the controller processes the door status output and communicates with the access device sensor in response to a request to move at least one of the door and the access device.

32. The control system of claim 28, further comprising a door sensor that provides a door status output, wherein the access device sensor provides an access device status output, and wherein the door status output and the access device status output are discrete outputs communicated to the access controller via an input module.

33. The control system of claim 28, wherein in response to a request to deploy the access system, the access controller processes a door status output to determine if the door is open or closed, and if the door status output indicates that the door is closed, the access controller controls the power sliding door subsystem via the communication bus to open the door while delaying operation of the access device.

34. The control system of claim 33, wherein the access controller controls the power sliding door subsystem by sending a replicated communication signal over the communication bus, the replicated communication signal corresponding to the at least one of the communication signals sent by the vehicle controller to control the power sliding door subsystem.

35. The control system of claim 28, wherein in response to a request to close the vehicle door, the access controller communicates with the access device sensor, and if the access device sensor indicates that the access device is not stowed, the access controller stows the access device while operation of the power sliding door subsystem is delayed.

36. The control system of claim 28, wherein the access controller is coupled to the communication bus via a multiplexed interface module.

37. The control system of claim 28, wherein the communication signals include commands and status information for the plurality of vehicle components, and wherein the access controller monitors the communication bus for a selected one of the communication signals and interprets the selected one of the communication signals as a request to operate both the access device and the power sliding door subsystem.

38. An access system for a vehicle, the access system comprising:
- a door control system for controlling movement of a vehicle door between open and closed positions;
- an access device installed in the vehicle and moveable between a stowed position and a deployed position that provides ingress and egress through the vehicle door;
- a first vehicle module operable to send a door operation command;
- a second vehicle module operable to receive and interpret the door operation command to initiate execution of a door operation;
- a communication pathway extending between the first vehicle module and the second vehicle module and carrying vehicle command signals in the form of coded data, the vehicle command signals including the door operation command;
- an access controller coupled to the access device to control movement of the access device between the stowed and deployed positions, the access controller coupled to the communication pathway for receiving the vehicle command signals and to identify at least the door operation command, wherein the access controller determines whether the vehicle door is in the open or closed position and whether the access device is in the stowed or deployed position and delays execution of the door operation command to avoid interference between the vehicle door and the access device when the vehicle door and the access device are in an incorrect state.

39. The access system of claim 38, wherein the door control system and the second vehicle module together define a power sliding door subsystem that controls operation of the vehicle door.

40. The access system of claim 38, wherein the vehicle signals are in the form of a communication protocol.

41. The access system of claim 38, wherein the access controller intercepts a vehicle control signal to selectively delay execution of the door operation command.

42. The access system of claim 41, wherein the vehicle control signal includes a signal sent to the second vehicle module.

43. The access system of claim 42, wherein the vehicle control signal includes a signal sent to the second vehicle module via the communication pathway, and wherein the vehicle control signal is a vehicle command signal.

44. The access system of claim 38, wherein the access controller operates the access device to correct the incorrect state while execution of the door operation command is delayed.

45. The access system of claim 44, wherein after the incorrect state has been corrected, the access controller initiates execution of the door operation command.

46. The control system of claim 45, wherein the access controller initiates execution of the door operation command by sending a replicated door operation command over the communication pathway, the replicated door operation command corresponding to the door operation command sent by the first vehicle module.

* * * * *